United States Patent
Ooshima

(10) Patent No.: US 9,489,900 B2
(45) Date of Patent: Nov. 8, 2016

(54) DISPLAY DEVICE THAT CAN SUPPRESS THE UNEVENNESS OF REFLECTION BRILLIANCE DUE TO THE GLARE OF AN OUTSIDE LIGHT ON A DISPLAY SURFACE

(71) Applicant: FUJIFILM Corporation, Tokyo (JP)

(72) Inventor: Hiroyuki Ooshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/617,501

(22) Filed: Feb. 9, 2015

(65) Prior Publication Data

US 2015/0154919 A1   Jun. 4, 2015

Related U.S. Application Data

(63) Continuation of application No. PCT/JP2013/070726, filed on Jul. 31, 2013.

(30) Foreign Application Priority Data

Aug. 15, 2012   (JP) ................................ 2012-180245

(51) Int. Cl.
G09G 3/34    (2006.01)
G02F 1/1333  (2006.01)

(52) U.S. Cl.
CPC ......... *G09G 3/3406* (2013.01); *G02F 1/13338* (2013.01); *G09G 3/3426* (2013.01);
(Continued)

(58) Field of Classification Search
CPC ............................................. G09G 2320/0233
See application file for complete search history.

(56) References Cited

U.S. PATENT DOCUMENTS 5,854,661 A * 12/1998 Kochanski ................... 348/602

6,366,270 B1 * 4/2002 Evanicky ............. G02B 6/0068
345/589

(Continued)

FOREIGN PATENT DOCUMENTS

JP   2005-346012 A   12/2005
JP   2007-292810 A   11/2007
(Continued)

OTHER PUBLICATIONS

International Search Report, mailed Oct. 8, 2013, issued in PCT/JP2013/070726.
(Continued)

*Primary Examiner* — Barry Drennan
*Assistant Examiner* — Jason Pringle-Parker
(74) *Attorney, Agent, or Firm* — Birch, Stewart, Kolasch & Birch, LLP

(57) ABSTRACT

A display device that can suppress the unevenness of reflection brilliance due to the glare of an outside light on a display surface, and can achieve the enhancement of the visibility of a display image. For preventing the unevenness of the reflection brilliance due to the glare of the outside light on the front surface of the display of the display device, a display device according to an aspect of the present invention corrects the display brilliance of the display image on the display and suppresses the unevenness. That is, the display brilliance of the display image is corrected for each pixel, such that a mixed display brilliance MDB resulting from adding the reflection brilliance on the front surface of the display and the display brilliance of the display image becomes a brilliance in accordance with a characteristic curve OMDBC that is fixed regardless of the reflection brilliance R.

12 Claims, 24 Drawing Sheets

(52) U.S. Cl.
CPC  *G09G2320/028* (2013.01); *G09G 2320/0233* (2013.01); *G09G 2320/0626* (2013.01); *G09G 2320/08* (2013.01); *G09G 2354/00* (2013.01); *G09G 2360/144* (2013.01)

(56) References Cited

U.S. PATENT DOCUMENTS

| | | | |
|---|---|---|---|
| 8,408,718 B2* | 4/2013 | Whitehead et al. | 353/85 |
| 2003/0122810 A1* | 7/2003 | Tsirkel et al. | 345/207 |
| 2003/0179219 A1* | 9/2003 | Nakano | G06F 3/0481 345/660 |
| 2004/0070565 A1* | 4/2004 | Nayar | G06K 9/4661 345/156 |
| 2004/0240056 A1* | 12/2004 | Tomisawa | G02B 27/2278 359/462 |
| 2005/0253877 A1* | 11/2005 | Thompson | G09G 3/3611 345/698 |
| 2007/0126884 A1* | 6/2007 | Xu | G06K 9/00221 348/220.1 |
| 2007/0171217 A1* | 7/2007 | Tsai | G09G 3/3406 345/207 |
| 2007/0247717 A1 | 10/2007 | Konno et al. | |
| 2008/0002102 A1* | 1/2008 | Lee | G09G 3/3413 349/68 |
| 2010/0277515 A1* | 11/2010 | Ward et al. | 345/690 |
| 2012/0044224 A1 | 2/2012 | Michisaka | |
| 2013/0100097 A1* | 4/2013 | Martin | 345/207 |

FOREIGN PATENT DOCUMENTS

| | | |
|---|---|---|
| JP | 2009-31337 A | 2/2009 |
| JP | 2011-48198 A | 3/2011 |
| JP | 2013-113940 A | 6/2013 |
| WO | WO 2010/134438 A1 | 11/2010 |

OTHER PUBLICATIONS

Written Opinion of the International Searching Authority, mailed Oct. 8, 2013, issued in PCT/JP2013/070726.

* cited by examiner

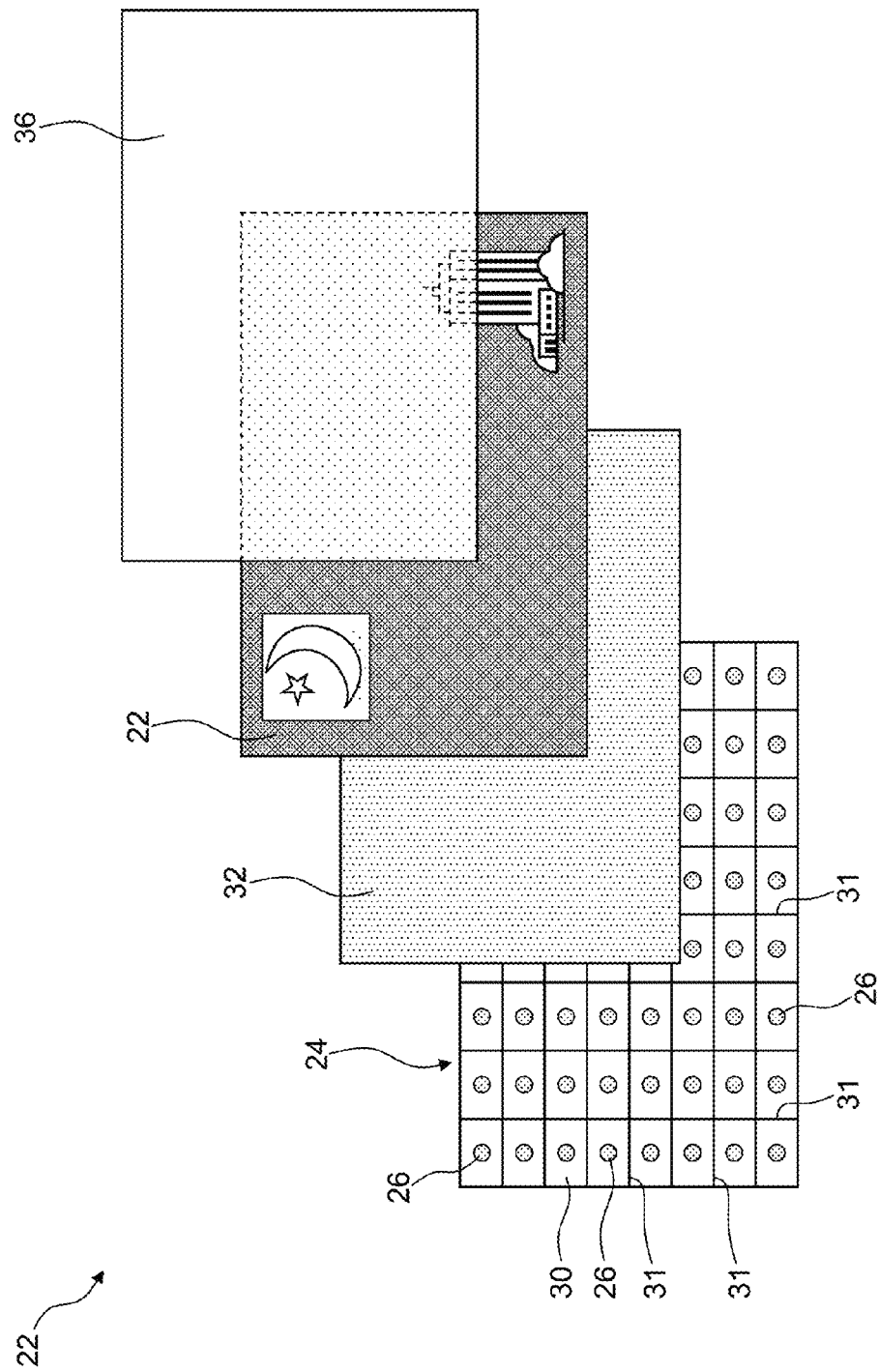

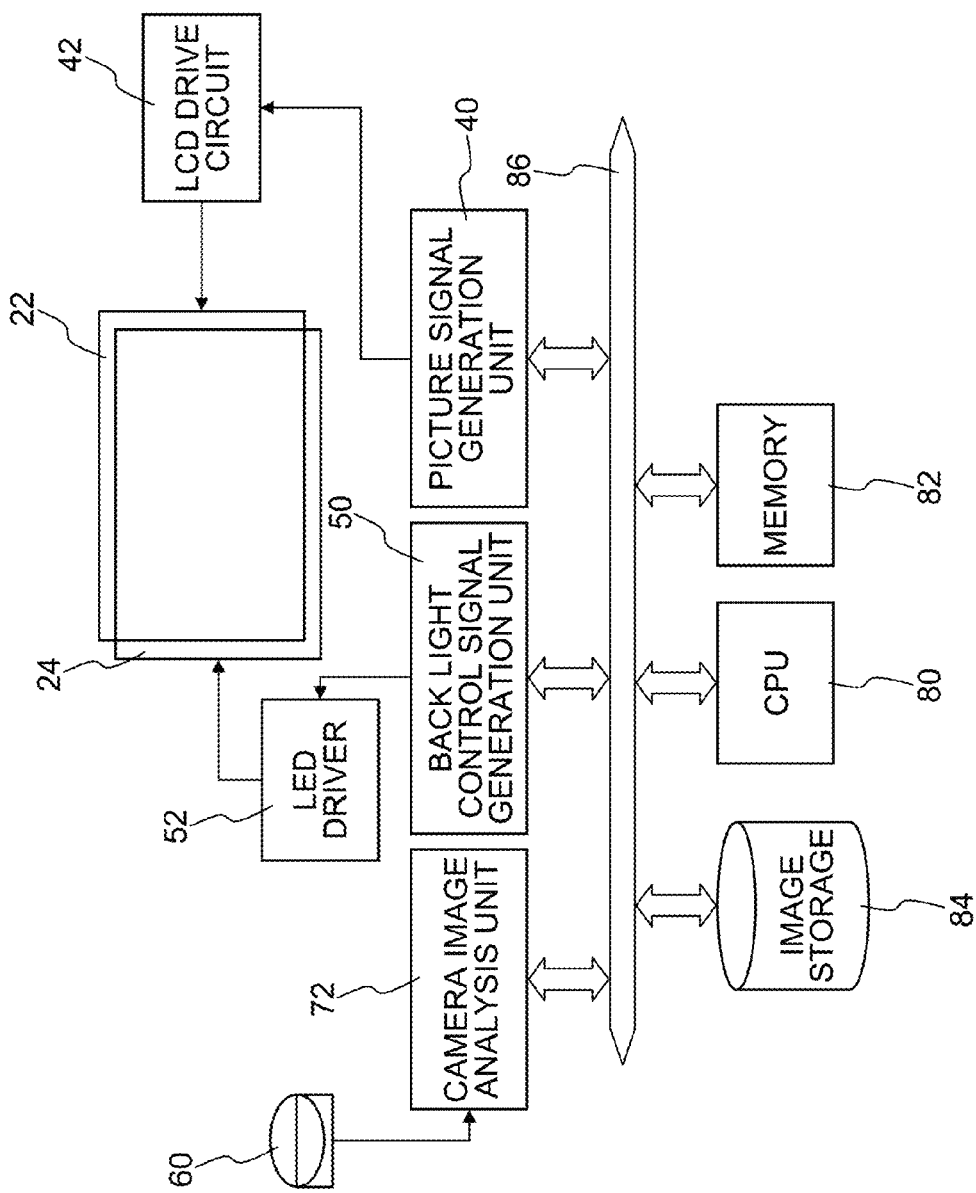

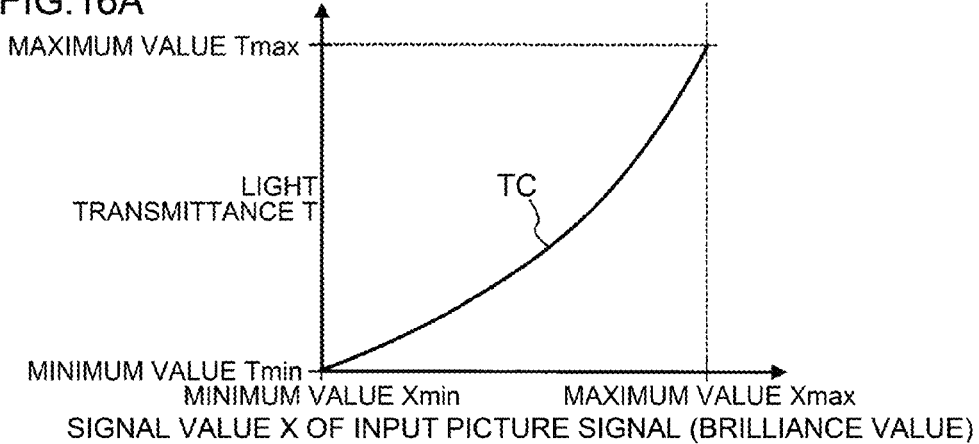
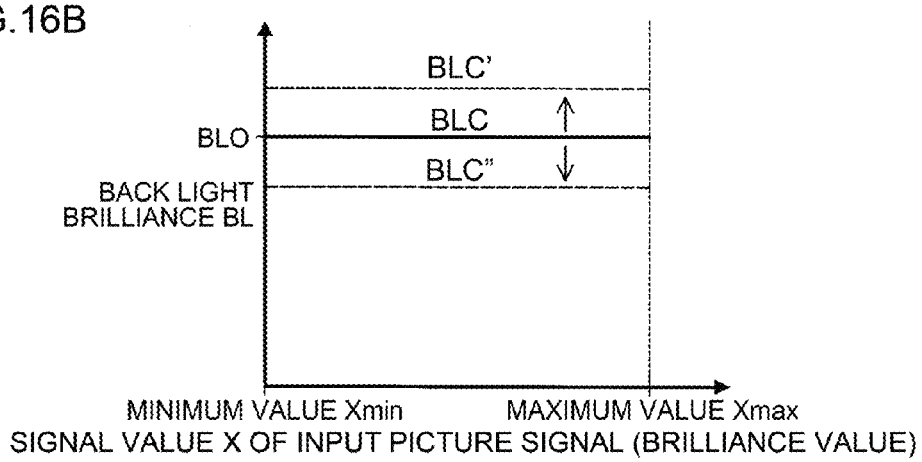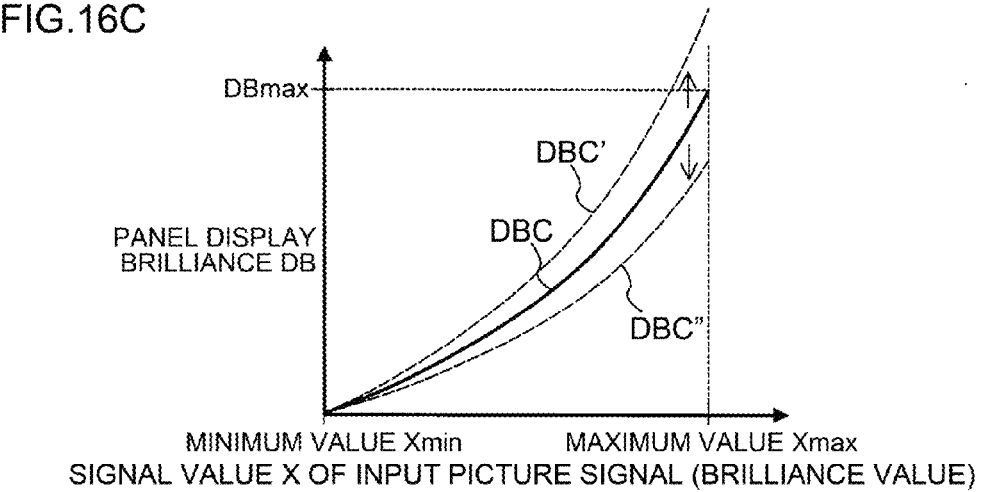

DISPLAY DEVICE THAT CAN SUPPRESS THE UNEVENNESS OF REFLECTION BRILLIANCE DUE TO THE GLARE OF AN OUTSIDE LIGHT ON A DISPLAY SURFACE

CROSS-REFERENCE TO RELATED APPLICATIONS

This application is a Continuation of PCT International Application No. PCT/JP2013/070726 filed on Jul. 31, 2013, which claims priority under 35 U.S.C. §119(a) to Japanese Patent Application No. 2012-180245 filed on Aug. 15, 2012. Each of the above application(s) is hereby expressly incorporated by reference, in its entirety, into the present application.

BACKGROUND OF THE INVENTION

1. Field of the Invention

The present invention relates to a display device, and particularly relates to a display device that includes a display (display element) to display an image and that can suppress (reduce) reflection unevenness.

2. Description of the Related Art

A display device including a display (monitor) to display an image such as a character, a figure and a photograph is incorporated in an arithmetic processing system (PC (personal computer)) to perform a variety of arithmetic processes, a portable information display terminal (a mobile terminal such as a mobile phone) to display a variety of information, or the like.

In such a display device, there is known a technology that automatically adjusts the brightness (display brilliance) of the screen (display image) on the display, depending on the surrounding brightness (the illumination intensity of an outside light to the display), and achieves the enhancement of the visibility. For example, a technology that detects the surrounding brightness (environmental brilliance) of the display, brightens the display image with the brightness of the surrounding, and thereby, makes the display image more visible is widely adopted.

Further, PTL 1 (Japanese Patent Application Laid-Open No. 2011-48198) discloses that, in consideration of the case where the illumination intensity of an outside light varies by the position on the front surface (display surface) of the display, the display brilliance of the whole display image is not uniformly adjusted, but the illumination intensity of the outside light is detected for each part on the display surface, and the brilliance and the color tone are adjusted depending on the detected illumination intensity.

PTL 2 (Japanese Patent Application Laid-Open No. 2007-292810) discloses that the intensity of the sunlight reflected in a direction from the display surface to an observer is detected, and the image quality adjustment of the display image to be displayed on the display is performed based on the detection result.

SUMMARY OF THE INVENTION

By the way, there is known a phenomenon called a glare of an outside light, in which a background of an observer, particularly, a high-brilliance matter such as the sun, a lighting device (fluorescent lamp) and a window glares on the front surface (display surface) of the display, causing a reflection unevenness (an unevenness of the reflection brilliance) on the display surface. The glare of the outside light, that is, the reflection unevenness brings about the decrease in the visibility of the display image, because of the overlap with the display image. Further, by the observation position (observation direction) of the observer to the display, the appearance of the glare of the outside light varies, and the visibility of the display image also varies.

In PTL 1, the brilliance adjustment and the like is performed for each part on the display surface, depending on the illumination intensity of the outside light, but the glare of the outside light on the display surface is not considered.

PTL 2 proposes that the visibility of the display image is enhanced by the image quality adjustment, when the sunlight is reflected in the direction from the display surface to the observer. This considers the relation between the observation position of the observer and the position of the sun with respect to the display surface, and proposes that the image quality adjustment is performed depending on not only the illumination intensity of the outside light but also the positional relation between them.

However, in PTL 2, an accurate detection of the positional relation between the observer and the sun is not performed, and a uniform image quality adjustment is performed for each of previously divided screen regions (for each screen of multiple screens), without the discrimination between regions where the glare of the sun appears and regions where it does not appear.

Meanwhile, the major cause of the decrease in visibility due to the glare of the outside light is that a high-brilliance matter such as the sun and a fluorescent lamp glares on a part of the display surface and the display image on the part becomes hard to view, and therefore, there is a problem in that, when the uniform image quality adjustment is performed to the display image on the peripheral part also, the image rather becomes hard to view.

The present invention, which has been made in consideration of such circumstances, has an object to provide a display device that can suppress the unevenness of the reflection brilliance due to the glare of an outside light on the display surface, and can achieve the enhancement of the visibility of the display image.

For achieving the above object, a display device according to the present invention includes: a two-dimensional display element to display a display image that is observed by an observer; an image taking device which takes an image of a side on which the display image of the display element is displayed; a face image detection device which detects a face image of the observer, from a taken image that is taken by the image taking device; a reflection brilliance estimation device which estimates a reflection brilliance distribution, based on a position of the face image of the observer detected by the face image detection device and brilliance information of the taken image, the reflection brilliance distribution indicating a reflection brilliance of an outside light at each point of a front surface of the display element, the outside light being visually recognized by the observer, the position of the face image of the observer being a position in the taken image; and a display brilliance correction device which corrects a display brilliance of the display image to be displayed on the display element, such that an unevenness of the reflection brilliance is reduced, based on the reflection brilliance distribution estimated by the reflection brilliance estimation device.

According to the present invention, it is possible to detect the face image of the observer, based on the taken image in which the front surface side of the display element is taken by a camera, and to estimate the reflection brilliance distribution of the outside light that the observer visually recognizes on the front surface of the display element from the position. Then, the display brilliance of the display image to be displayed on the display element is corrected based on the reflection brilliance distribution, and thereby, it is possible to reduce the unevenness of the reflection brilliance. Thereby, the enhancement of the visibility of the display image is achieved.

The present invention can adopt an aspect in which the display element includes a transmission type liquid crystal panel and a back light unit that is disposed at a back surface side of the liquid crystal panel, the back light unit includes multiple light-emitting elements that are two-dimensionally arrayed and whose brilliances can be controlled individually, and the display brilliance correction device corrects the display brilliance of the display image to be displayed on the liquid crystal panel, by altering a light-emitting brilliance of each of the multiple light-emitting elements based on the reflection brilliance distribution estimated by the reflection brilliance estimation device.

The aspect is one aspect for correcting the display brilliance of the display image to be displayed on the liquid crystal panel, and an aspect in which the light-emitting brilliance of the light-emitting element of the back light unit, that is, the brightness (back light brilliance) of the back light that is emitted to the display panel is corrected. This makes it possible to decrease and correct the light-emitting brilliance of the light-emitting element, allowing for a power saving.

The present invention can adopt an aspect in which the display element includes a transmission type liquid crystal panel, and a back light unit that is disposed at a back surface side of the liquid crystal panel, and the display brilliance correction device corrects the display brilliance of the display image, by correcting a light transmittance at each point of the liquid crystal panel based on the reflection brilliance distribution estimated by the reflection brilliance estimation device.

The aspect is one aspect for correcting the display brilliance of the display image to be displayed on the liquid crystal panel, and an aspect in which the light transmittance of the liquid crystal panel is corrected and thereby the display brilliance of the display image is corrected. In this aspect, it is unnecessary to control the back light brilliance, and there is an advantage of a simple control. Further, the back light unit does not need to have means for controlling the light-emitting brilliances of the light-emitting elements individually.

The present invention can adopt an aspect in which the display element includes a transmission type liquid crystal panel, and a back light unit that is disposed at a back surface side of the liquid crystal panel, the back light unit includes multiple light-emitting elements that are two-dimensionally arrayed and whose brilliances can be controlled individually, and the display brilliance correction device corrects the display brilliance of the display image, by altering a light-emitting brilliance of each of the multiple light-emitting elements based on the reflection brilliance distribution estimated by the reflection brilliance estimation device and therewith correcting a light transmittance at each point of the liquid crystal panel based on the reflection brilliance distribution estimated by the reflection brilliance estimation device.

The aspect is one aspect for correcting the display brilliance of the display image to be displayed on the liquid crystal panel, and an aspect in which both the light-emitting brilliance (back light brilliance) of the light-emitting element of the back light unit and the light transmittance of the liquid crystal panel are corrected. Since the two elements can be corrected, the freedom degree of the control is high, and for example, a power-saving-preferential control can be suitably performed.

The present invention can adopt an aspect in which the display brilliance correction device does not perform the correction, when the face image of the observer is not detected by the face image detection device.

According to the aspect, it is possible to prevent an incorrect operation when the face image of the observer is not detected.

The present invention can adopt an aspect in which the image taking device takes the image at least at a proper exposure and a lower exposure than the proper exposure, the face image detection device detects the face image of the observer, using a taken image taken at the proper exposure by the image taking device, and the reflection brilliance estimation device estimates the reflection brilliance distribution, using a taken image taken at the lower exposure than the proper exposure by the image taking device.

According to the aspect, it is possible to prevent a situation in which blown-out highlights occur in an object with not less than a certain brilliance and the reflection brilliance distribution cannot be accurately estimated.

The present invention can adopt an aspect in which the display brilliance correction device corrects the display brilliance of the display image to be displayed on the display element, for an input image that is given by a picture signal as the display image to be displayed on the display element, and sets a mixed display brilliance resulting from adding the display brilliance of the display image displayed on the display element and the reflection brilliance of the front surface of the display element between corresponding points, as an objective mixed display brilliance that is intended for a signal value of the picture signal.

The aspect is an aspect in which the display brilliance of the display image is corrected such that the mixed display brilliance resulting from adding the display brilliance of the display image to be displayed on the display element and the reflection brilliance of the front surface of the display element between the corresponding points becomes the objective mixed display brilliance. The correction of the display brilliance of the display image is not limited to a particular method.

The present invention can adopt an aspect in which the display brilliance correction device alters the light-emitting brilliance of each of the multiple light-emitting elements of the back light unit, and sets a mixed display brilliance resulting from adding the display brilliance of the display image displayed on the display element and the reflection brilliance of the front surface of the display element between corresponding points for an input image that is given by a picture signal as the display image to be displayed on the display element, as an objective mixed display brilliance that is intended for a signal value of the picture signal.

The aspect shows a specific aspect when the light-emitting brilliance (back light brilliance) of the light-emitting element of the back light unit is corrected for the correction of the display brilliance of the display image to be displayed on the liquid crystal panel.

The present invention can adopt an aspect in which the display brilliance correction device corrects the light transmittance at each point of the liquid crystal panel, for a brilliance of an input image that is given by a picture signal as the display image to be displayed on the display element, and sets a mixed display brilliance resulting from adding the display brilliance of the display image displayed on the display element and the reflection brilliance of the front surface of the display element between corresponding points for the input image, as an objective mixed display brilliance that is intended for a signal value of the picture signal.

The aspect shows a specific aspect when the light transmittance of the liquid crystal panel is corrected for the correction of the display brilliance of the display image to be displayed on the liquid crystal panel.

The present invention can adopt an aspect in which the display brilliance correction device alters the light-emitting brilliance of each of the multiple light-emitting elements of the back light unit, corrects the light transmittance at each point of the liquid crystal panel, for a brilliance of an input image that is given by a picture signal as the display image to be displayed on the display element, and sets a mixed display brilliance resulting from adding the display brilliance of the display image displayed on the display element and the reflection brilliance of the front surface of the display element between corresponding points for the input image, as an objective mixed display brilliance that is intended for a signal value of the picture signal.

The aspect shows a specific aspect when both the light-emitting brilliance (back light brilliance) of the light-emitting element of the back light unit and the light transmittance of the liquid crystal panel are corrected for the correction of the display brilliance of the display image to be displayed on the liquid crystal panel.

The present invention can adopt an aspect in which the display brilliance correction device sets a lower limit value of a variable range of the objective mixed display brilliance, to a value that is greater than or equal to a maximum brilliance in the reflection brilliance distribution.

According to the aspect, it is possible to control the mixed display brilliance in a dark-part side region where the display brilliance of the display image is low such that it surely becomes the objective mixed display brilliance corresponding to the signal value of the picture signal, even when the region is high in the reflection brilliance, and it is possible to suitably suppress the unevenness of the reflection brilliance in the dark-part region of the display image.

The present invention can adopt an aspect in which in a case of a power saving mode, the display brilliance correction device sets an upper limit value of a variable range of the objective mixed display brilliance, to a value that is less than or equal to an upper limit value of a variable range of the display brilliance of the display image when the correction is not performed.

According to the aspect, it is possible to correct the display brilliance of the display image in a direction in which it is reduced, regardless of the level of the reflection brilliance, and the level of the display brilliance of the display image (the level of the signal value of the picture signal) when the correction is not performed, and it is possible to reduce the power to be consumed for image display, relative to when the correction is not performed.

The present invention can adopt an aspect in which in a case of a visibility enhancement mode, the display brilliance correction device sets an upper limit value of a variable range of the objective mixed display brilliance, to a value that is greater than or equal to a mixed display brilliance resulting from adding a maximum brilliance in the reflection brilliance distribution and an upper limit value of a variable range of the display brilliance of the display image when the correction is not performed.

The aspect enables the variable range of the mixed display brilliance of the display image when the correction is performed, to be greater than or equal to the variable range (dynamic range) of the display brilliance of the display image when the correction is not performed, and it is possible to perform an image display with a good visibility.

The present invention can adopt an aspect in which the display brilliance correction device alters the lower limit value of the variable range of the objective mixed display brilliance, depending on a state of the reflection brilliance distribution.

The present invention can adopt an aspect in which the display brilliance correction device alters the upper limit value of the variable range of the objective mixed display brilliance, depending on a state of the reflection brilliance distribution.

The present invention can adopt an aspect in which the reflection brilliance estimation device extracts, in the taken image taken by the image taking device, an image in a range corresponding to a size and a shape of the front surface of the display element, on the basis of a position that is point-symmetric to the position of the face image of the observer detected by the face image detection device, using a previously designated symmetric point, and estimates the reflection brilliance distribution based on brilliance information of the image in the extracted range.

According to the present invention, it is possible to reduce the unevenness of the reflection brilliance due to the glare of an outside light on the display surface, and to achieve the enhancement of the visibility of a display image.

BRIEF DESCRIPTION OF THE DRAWINGS

FIG. 4 is an exploded perspective view showing the schematic configuration of a display.

FIG. 5 is a block diagram showing a partial configuration associated with the present invention and extracted from the mobile terminal to which the present invention is applied.

FIG. 16A is a diagram relevant to a display brilliance control in an ordinary display.

FIG. 16B is another diagram relevant to the display brilliance control in the ordinary display.

FIG. 16C is another diagram relevant to the display brilliance control in the ordinary display.

DETAILED DESCRIPTION OF THE EMBODIMENTS

Hereinafter, preferable embodiments of the present invention are explained in detail, with reference to the accompanying drawings.

Figure 1:
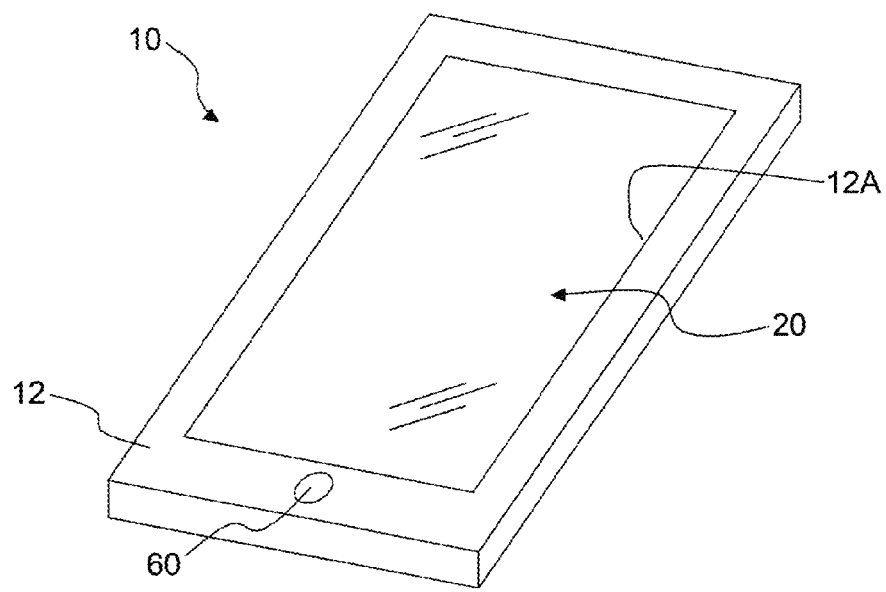
FIG. 1 is a perspective view showing the external appearance of a mobile terminal to which the present invention is applied.
Figure 2:
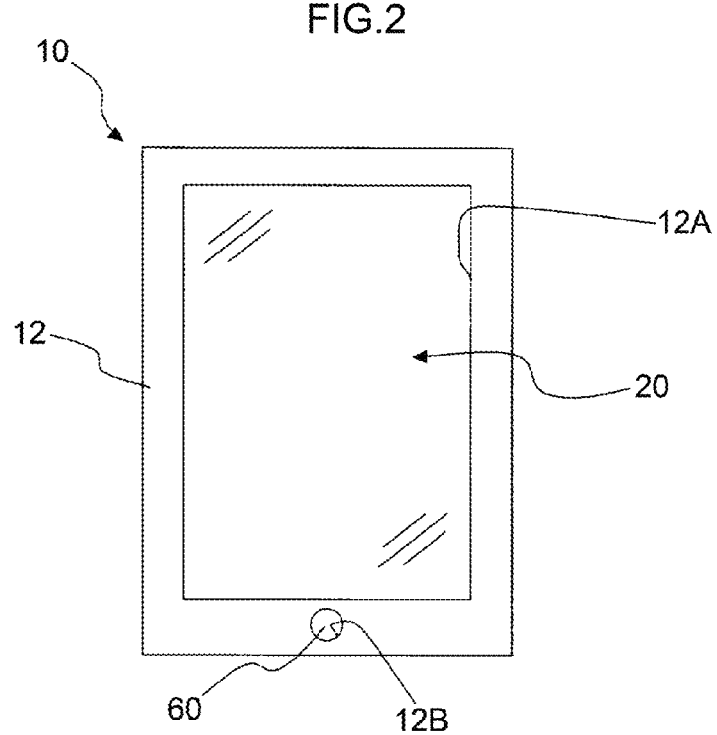
FIG. 2 is an elevation view showing the external appearance of the mobile terminal to which the present invention is applied.
Figure 3:
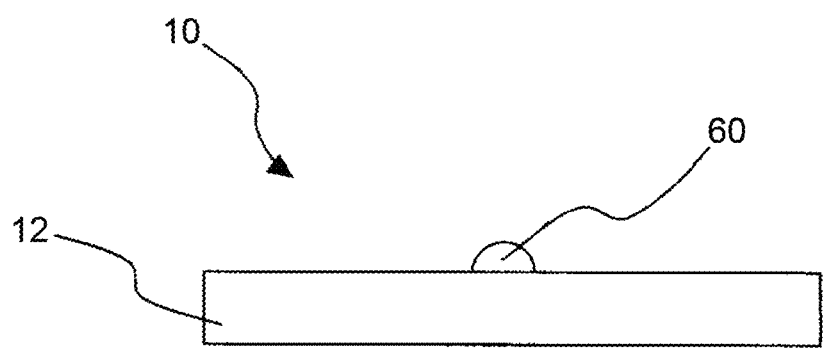
FIG. 3 is a bottom view showing the external appearance of the mobile terminal to which the present invention is applied.

FIGS. 1 to 3 are a perspective view, elevation view and bottom view showing the external appearance of a mobile terminal 10 to which the present invention is applied, such as a mobile phone (a smart phone or the like) and a tablet terminal.

As shown in these figures, the mobile terminal 10 includes a case frame 12 covering an edge part on the front side, side surfaces and a rear surface, a display (two-dimensional display element) 20 disposed at the front side, and a camera (the image taking device) 60 disposed at a lower central position on the front side, which is not on the display 20, and is configured such that the whole outer surface has a thin type rectangular parallelepiped (plate shape).

The case frame 12 contains and holds built-in things such as circuits, in the internal space. Therewith, it includes the display 20, which has a rectangular shape, in a rectangular opening 12A provided on the front side, and includes the camera 60 in an opening 12B provided near the opening 12A.

The display 20 is a liquid crystal display (LCD) with a touch panel, for example. As shown in FIG. 4, a touch panel 36 is disposed at the outermost surface (forefront surface) side, and a LCD panel 22 is disposed behind the touch panel 36. Behind the LCD panel 22, a diffusion plate 32 is disposed, and behind this, a back light unit 24 is disposed and configured.

In the back light unit 24, partition plates 31, 31, . . . are disposed on the anterior surface of a substrate 30, in a lattice pattern, and in the respective regions, in which the division by these partition plates 31 suppress the light leakage to the periphery, white LEDs (Light Emitting Diodes) 26, 26, . . . are disposed as light-emitting elements. Thereby, on the substrate 30, the multiple (many) white LEDs 26 (light-emitting elements) are two-dimensionally arrayed at regular intervals in the longitudinal and lateral directions.

Further, a circuit mounted on the substrate 30, which is configured such that the light-emitting brilliances of the respective white LED 26 can be controlled individually, allows the back light to perform the lighting of the LCD panel 22 at a brightness varying among the regions, by the back light local dimming (BLD) technology. Here, although the embodiment explains that the brightness (back light brilliance) of the back light can be controlled for each pixel of the LCD panel 22, the back light unit 24 may control the back light brilliance for each region that includes multiple pixels of the LCD panel 22, and, also in that case, it is assumed that one region is regarded as one pixel and the back light brilliance can be controlled for each pixel.

The LCD panel 22, which is a transmission type LCD panel (liquid crystal panel), individually controls the light transmittances at the respective points (pixels) on the two-dimensional plane of a widely known liquid crystal layer. Thereby, the brilliances of the respective pixels of the LCD panel 22 are controlled, and an intended image is displayed.

Further, the touch operation to the front surface of the touch panel 36, that is, to the front surface (referred to as s display surface 34) of the display 20 is detected by the touch panel 36 disposed at the anterior surface side of the LCD panel 22, and the input operation of a variety of information can be performed by the touch operation to the display surface 34.

Here, as for the type of the display 20, the type of the touch panel 36 is not particularly limited, and the touch panel 36 may not be included.

Further, hereinafter, the front surface (display surface 34) of the display 20 means a region that is on a surface present at the front surface side (observer side) with respect to a two-dimensional image display region on the display 20 for displaying an image, and that overlaps with the image display region in the orthogonal direction, and even when a transparent member forming the display surface 34 is extended to a range beyond the image display region, the surface of the extending part is not included.

The camera 60 shown in FIG. 1 to FIG. 3 is constituted by an optical system (a lens, an iris and the like) to form a light image of an object, a solid-state imaging element (a CCD, a MOS or the like) to photo-electrically convert the light image formed by the optical system, into an electric signal, and the like.

By the camera 60, an image is taken of the side opposite to the display surface 34 (the front side of the mobile terminal 10), a still image or moving image of the taken object is brought in an internal circuit, and the recording and saving of the taken image, and the like are performed. Here, it is preferable that the camera 60 in the embodiment be a wide-angle camera using a wide-angle lens such as a fish-eye lend.

FIG. 5 is a block diagram showing a partial configuration associated with the present invention and extracted from the above mobile terminal 10.

As shown in FIG. 5, the mobile terminal 10 includes a CPU 80, a memory 82, a picture signal generation unit 40, a back light control signal generation unit 50, a camera image analysis unit 72, an image storage 84 and the like that are connected with each other, through a bus 86 that allows for the data transmission among the respective processing units.

The CPU 80 is a central processing unit to perform various arithmetic processes in accordance with a previously determined program. The respective processing units in the mobile terminal 10 operate in accordance with control signals to be given from the CPU 80, and thereby, the whole apparatus is integrally controlled by the CPU 80.

The memory 82 is storage means including a read-only ROM (Read Only Memory) in which programs to be executed by the CPU 80 and other necessary data are stored, and a readable and writable RAM (Random Access Memory) in which data to be temporarily used by the CPU 80 and the like are put, and performs the data exchange with the CPU 80 and the like through the bus 86.

The image storage 84 is an external storage device in which image data of a taken image taken by the camera 60 are stored, such as a memory card or a hard disk. In the embodiment, the external storage device is referred to as the image storage 84 because of being mainly used for the storage of the image data, but the image storage 84 is not particularly limited to the use for storing image data, and arbitrary data can be stored therein.

Based on the image data (input image; this corresponds to an input picture signal) input from the CPU 80, the image storage 84 or the like through the bus 86, the picture signal generation unit 40 generates a picture signal in a format for displaying the image (picture) on the LCD panel 22 shown in FIG. 4 that constitutes the display 20, and outputs the picture signal to an LCD drive circuit 42.

The LCD drive circuit 42 drives the LCD panel 22, and controls the light transmittances for the respective pixels of the LCD panel 22, in accordance with the picture signal given from the picture signal generation unit 40. Thereby, an image corresponding to the picture signal given to the LCD drive circuit 42 is displayed on the LCD panel 22.

The back light control signal generation unit 50 generates a control signal indicating the light-emitting brilliances of the respective white LEDs 26 of the back light unit 24 shown in FIG. 4 that constitutes the display 20, based on the information given from the CPU 80, and sends the control signal to an LED driver 52.

The LED driver 52 drives the respective white LEDs 26 of the back light unit 24, and controls the light-emitting brilliances of the respective white LEDs 26, in accordance with the control signal given from the back light control signal generation unit 50. Thereby, the brightness (back light brilliance) of the back light (illumination light) to be emitted from the back light unit 24 to the LCD panel 22 is controlled by the CPU 80.

The camera image analysis unit 72 brings in the taken image that is taken and obtained by the camera 60, executes a later described analysis process such as a face detection, and sends the analysis result data and the like to the CPU 80.

The detail of the configuration associated with the camera 60 is omitted in the figure. In the camera 60, which includes the optical system and the solid-state imaging element, the optical system and the solid-state imaging element are driven in accordance with the control signal from the CPU 80, and the image of the still image and a moving image is taken. The image signal obtained by the solid-state imaging element, to which necessary analog signal processes (CDS, AGC and the like) and digital signal processes (AWB, contour correction, gain correction and the like) after the conversion into a digital signal are performed, is sent to the camera image analysis unit 72, as data of the taken image. Here, the camera image analysis unit 72 just needs to have a configuration in which the data of the taken image taken by the camera 60 are input directly or indirectly only when the process is necessary, and may have a configuration in which the sending is performed to other processing units such as the CPU 80, the picture signal generation unit 40 and the image storage 84, through the bus 86, without going through the camera image analysis unit 72.

Next, a suppression process for reflection unevenness in the mobile terminal 10 configured as described above is explained. The outline of the suppression process for reflection unevenness is explained using FIGS. 6A to 6D.

Figure 6A:
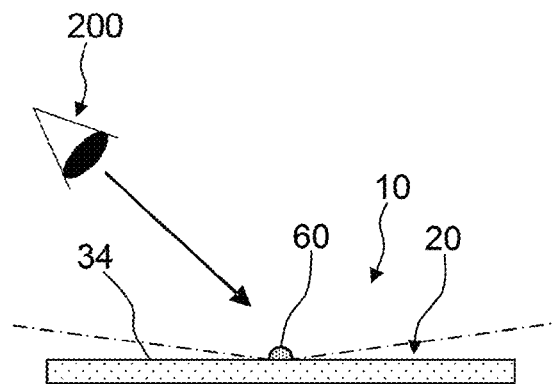
FIG. 6A is an explanatory diagram showing the flow of a suppression process for reflection unevenness.

FIG. 6A shows a state in which an observer (observer's eyes 200) observes a display image displayed on the display 20 from the diagonally forward left direction with respect to the mobile terminal 10. That is, it is comparable to a state in which the mobile terminal 10 is held horizontally (the longer direction is the crosswise direction) and the screen of the display 20 is observed from the diagonally downward side.

On this occasion, assuming that a high-brilliance matter not shown in the figure such as a fluorescent lamp is present at the side opposite to the display surface 34 of the mobile terminal 10, the light from the high-brilliance matter is emitted to each position on the display surface 34 and is reflected. Of the reflected light, the reflected light that enters the observer's eyes 200 to be visually recognized makes the reflection position on the display surface 34 brighter than other parts.

That is, when the material for forming the display surface 34 is a material causing specular reflection such as glass and acrylic, the observer visually recognizes a body that comes in the visual field range by the reflection on the display surface 34, as a glare (glare image) of the outside light on the display surface 34. Thus, the visual filed range (glare range) or glare image by the reflection on the display surface 34 varies depending on the positional relation between the display surface 34 and the observer's eyes 200.

Figure 7:
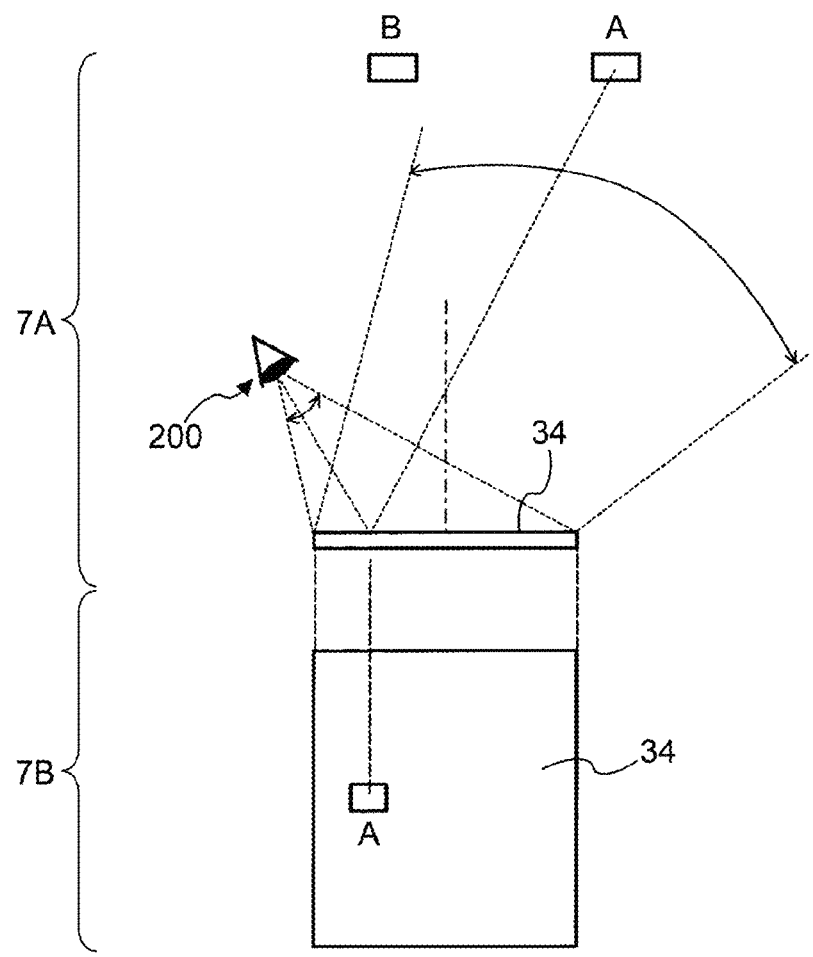
FIG. 7 is an explanatory diagram that is used for the explanation of reflection unevenness.
Figure 8:
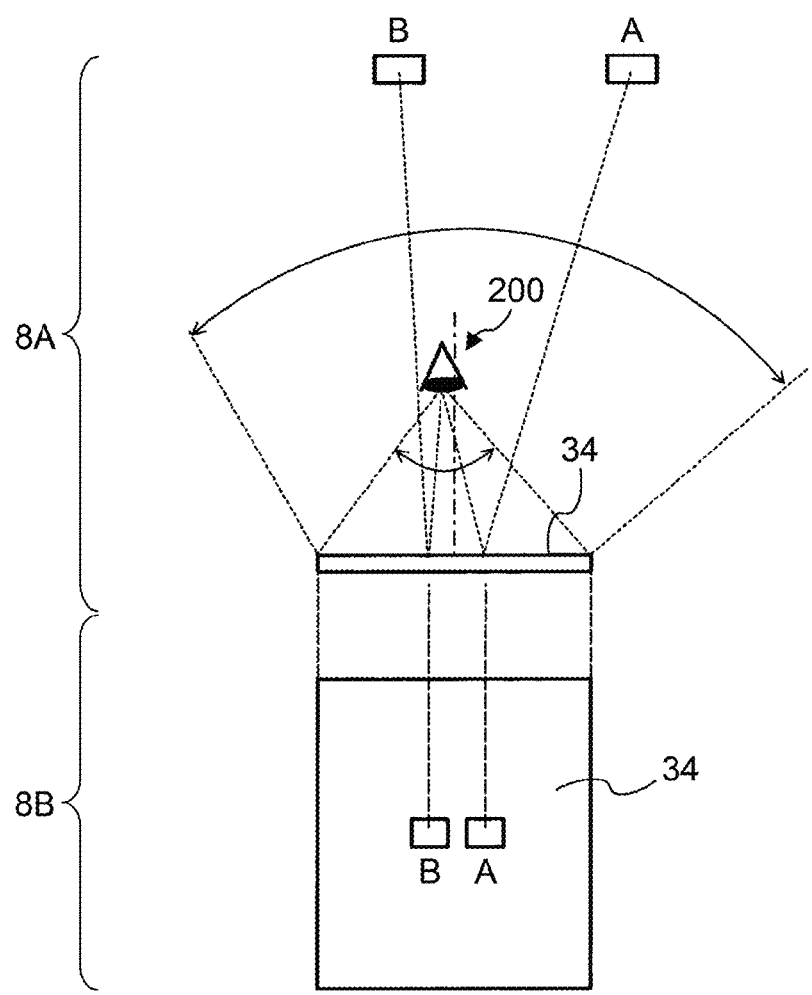
FIG. 8 is an explanatory diagram that is used for the explanation of reflection unevenness.

For example, as shown in FIG. 7 and FIG. 8, high-brilliance matters A, B are present at the side opposite to the display surface 34 of the mobile terminal 10, and the observer (the eyes 200) observes the display surface 34 at different angles from the perpendicular direction with respect to the display surface 34. In the case of the observation at the angle in FIG. 7, which is greater than the angle in FIG. 8, as shown in the 7A portion of FIG. 7, only the high-brilliance matter A that is present forwarder than the high-brilliance matter B as viewed from the observer comes in the visual filed range of the observer, by the reflection on the display surface 34. Therefore, as shown in the 7B portion, which shows the front of the display surface 34, the high-brilliance matter A brightly glares on the display surface 34, and the high-brilliance matter B does not glare.

In contrast, in the case of the observation at the angle in FIG. 8, as shown in the 8A portion of FIG. 8, both of the high-brilliance matter A and the high-brilliance matter B come in the visual filed range of the observer by the reflection on the display surface 34, and as shown in the 8B portion, both of the high-brilliance matter A and the high-brilliance matter B brightly glare on the display surface 34. Here, it is assumed that the observer himself does not glare on the display surface 34 and the light is not blocked by the observer.

Further, the glare image on the display surface 34 is not limited to a high-brilliance matter such as a fluorescent lamp and the sun. The brightness of the glare on the display surface 34 depends on the brightness of a body present in the glare range.

Such a glare of the outside light generates a reflection unevenness (an unevenness of the reflection brilliance) on the display surface 34, and decreases the visibility of the display image displayed on the image display surface (the LCD panel 22 in the embodiment) of the display 20.

Figure 6B:
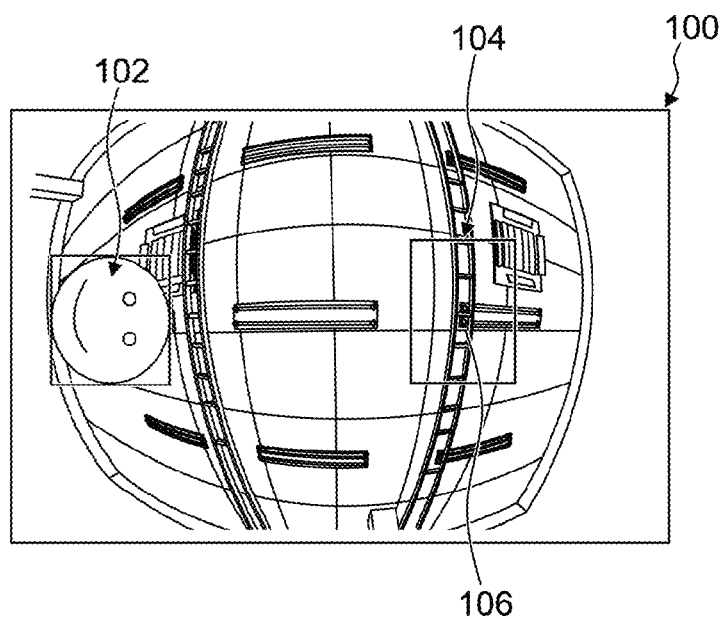
FIG. 6B is another explanatory diagram showing the flow of the suppression process for reflection unevenness.

In the mobile terminal 10 according to the embodiment, as a reflection unevenness suppression process for suppressing (reducing) the reflection unevenness on the display surface 34 that is generated in this way, first, an image of the side opposite to the display surface 34 is taken by the camera 60, and a taken image 100 is acquired as shown in FIG. 6B. Then, a face image 102 of the observer is detected from the taken image 100, using an arbitrary face detection technology that is presently known. Here, generally, the mobile terminal 10 is rarely used simultaneously by multiple persons, and therefore, it is assumed that the taken image contains only the face image of a single person and the detected face image is the face image of the observer.

After the face image 102 of the observer is detected, next, based on the position of the face image 102 of the observer in the taken image 100, a visual field range that the observer visually recognizes by the reflection on the display surface 34, that is, an image range (glare range 104) that glares on the display surface 34 as a glare image is specified from the taken image 100, as shown in FIG. 6B.

Figure 6C:
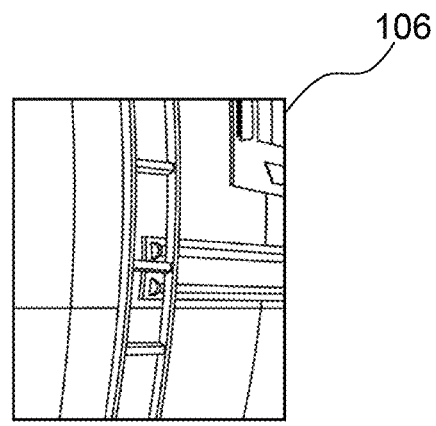
FIG. 6C is another explanatory diagram showing the flow of the suppression process for reflection unevenness.

After the glare range 104 is specified, an image 106 in the glare range 104 is extracted as shown in FIG. 6C, and the brilliance distribution of the glare image that the observer visually recognizes as a reflection unevenness on the display surface 34, that is, the reflection brilliance distribution indicating the reflection brilliances of the outside light at the respective points on the display surface 34 is determined based on the brilliance distribution of the image 106 in the glare range 104.

Figure 6D:
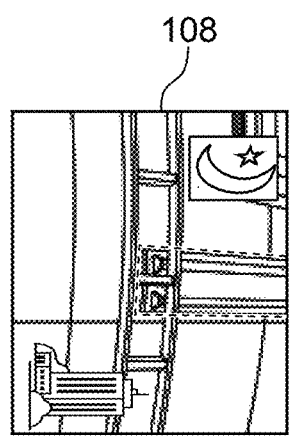
FIG. 6D is another explanatory diagram showing the flow of the suppression process for reflection unevenness.

After the reflection brilliance distribution of the outside light on the display surface 34 is determined, the display brilliance of the display image to be displayed on the display surface 34 is corrected (display brilliance correction process), based on the reflection brilliance distribution. When the observer observes a display image 108 displayed on the display surface 34 as shown in FIG. 6D, the image in the glare range 104 in FIG. 6C glares as the glare image and generates the reflection unevenness. The correction is performed such that a mixed display brilliance resulting from adding the display brilliance of the display image 108 and the reflection brilliance of the outside light on the display surface 34 between corresponding points (between positions overlapping in the orthogonal direction with respect to the display surface 34), that is, the display brilliance of a display image containing the reflection of the outside light that the observer visually recognizes in practice, has a brilliance distribution with no reflection unevenness. Thereby, such a display image that the observer cannot visually recognize the reflection unevenness is displayed.

As described later, the correction of the display brilliance of the display image to be displayed on the display surface 34 is performed by the correction of the brightness (back light brilliance) of the back light to be emitted from the back light unit 24 to the LCD panel 22, or by the correction of the light transmittance of the LCD panel 22 (the light transmittance of the liquid crystal layer).

Figure 9:
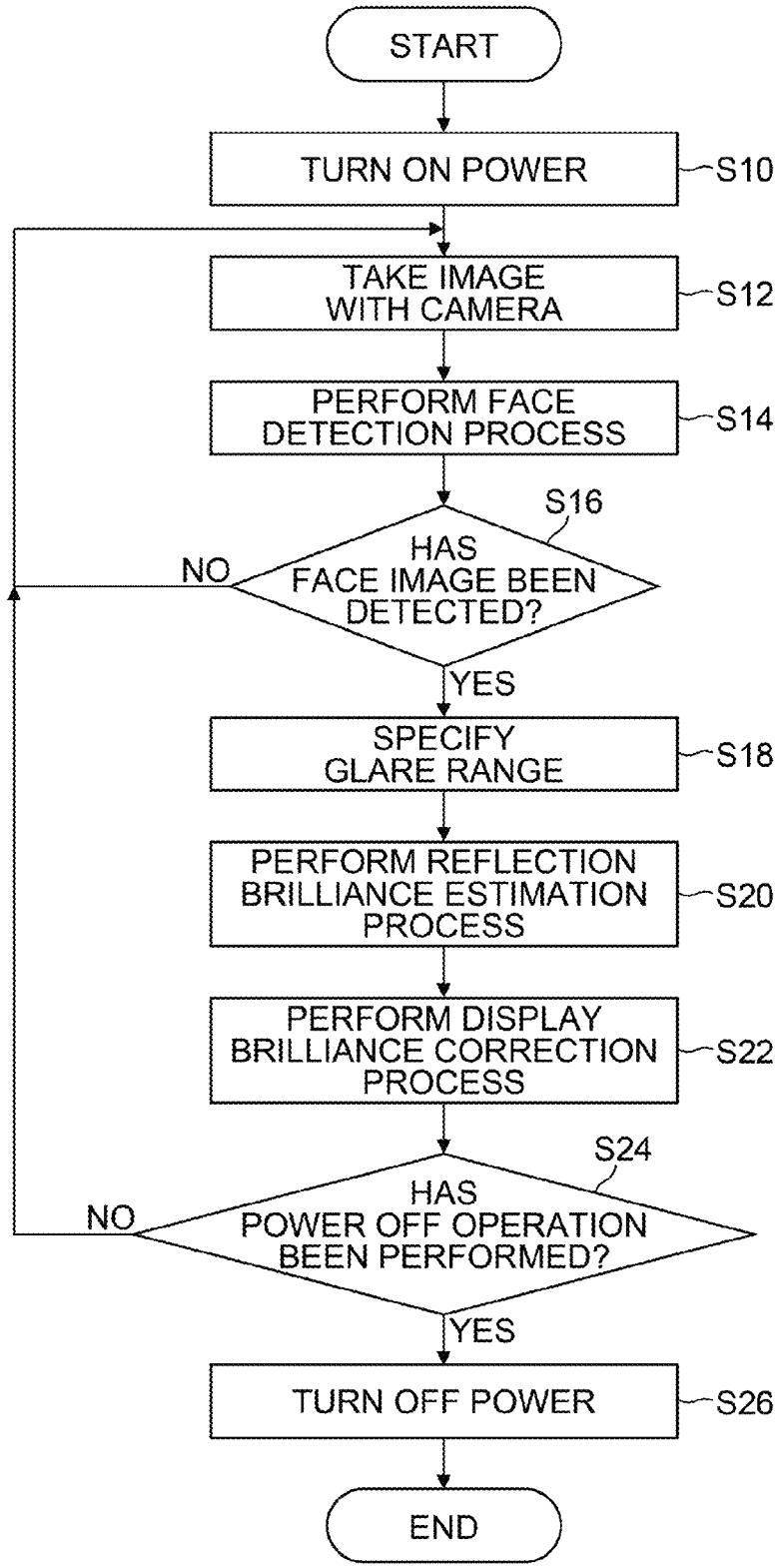
FIG. 9 is a flowchart showing a processing procedure of a reflection unevenness suppression process.

Next, the detail of the reflection unevenness suppression process for suppressing (reducing) the reflection unevenness on the display surface 34 is explained in order, with reference to a flowchart in FIG. 9.

In step S10, an initial process at the activation time when the power of the mobile terminal 10 is turned on is performed in the CPU 80 and the like. Then, the transition to the process in step S12 is performed.

In step S12, the camera 60 is driven by the instruction from the CPU 80, and an image of the side opposite to the display surface 34 is taken by the camera 60. Then, the taken image is brought in the camera image analysis unit 72. After this process, the transition to the process in step S14 is performed. Here, the processes from the step S12 to an undermentioned step S24 are repetitively performed, under a situation in which an arbitrary image is displayed on the display 20 as a display image.

In step S14, a face detection process in which the face image of the observer is detected from the taken image brought in step S12 is performed by face image detection means included in the camera image analysis unit 72 (the face image detection device).

Figure 10A:
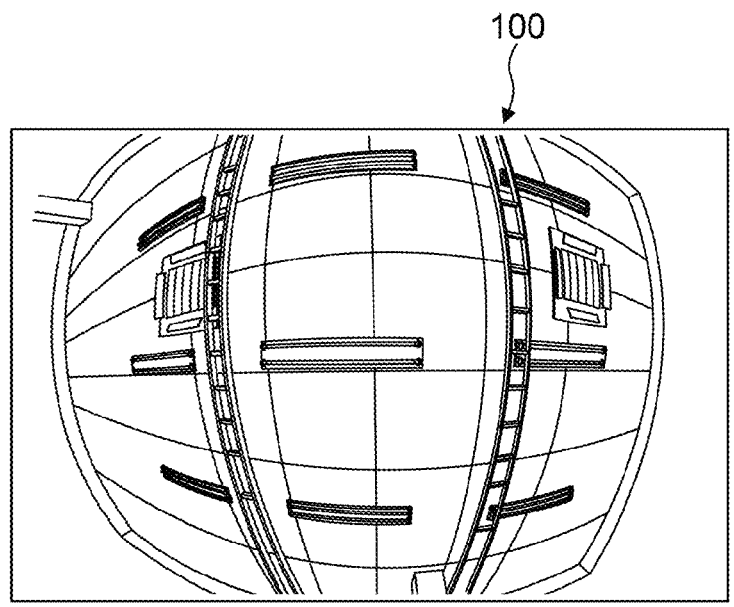
FIG. 10A is a diagram showing an example of a taken image taken by a camera of the mobile terminal.

FIG. 10A shows an example of the taken image taken by the camera 60 of the mobile terminal 10. Here, originally, the face image of the observer is also contained in the taken image, but it is omitted in the FIG. 10A. As shown in FIG. 10A, the taken image 100 taken by the camera 60 has a distortion such as a barrel aberration, by the optical characteristic (lens characteristic), and is not an image in which the perspective projection is exactly performed for the real space. Particularly, it is preferable to use, as the camera 60, a wide-angle camera using a wide-angle lens such as a fish-eye lens, and in that case, the taken image has a great distortion.

Figure 10B:
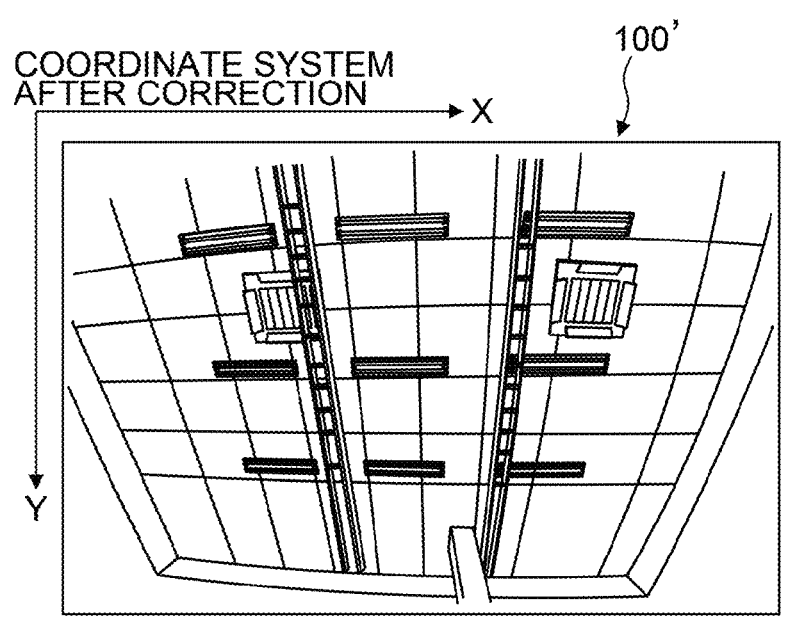
FIG. 10B is a diagram showing an example of an image after a distortion correction process is performed to the taken image shown in FIG. 10A.

Therefore, before the detection of the face image is performed, a distortion correction process corresponding to the optical characteristic is performed to the taken image by the camera 60, and it is converted into a taken image 100' having no distortion as shown in FIG. 10B. Such a distortion correction process may be performed to all taken images when the images are taken by the camera 60, regardless of whether the reflection unevenness suppression process is performed, or may be performed only when the reflection unevenness suppression process is performed. Further, for example, when the distortion is not great, it is not necessarily required to perform the distortion correction process.

Here, in the case where such a distortion correction process is performed, the taken image to be used in subsequent processes is a taken image after the distortion correction process is performed, even when that description is not explicitly shown.

Figure 11:
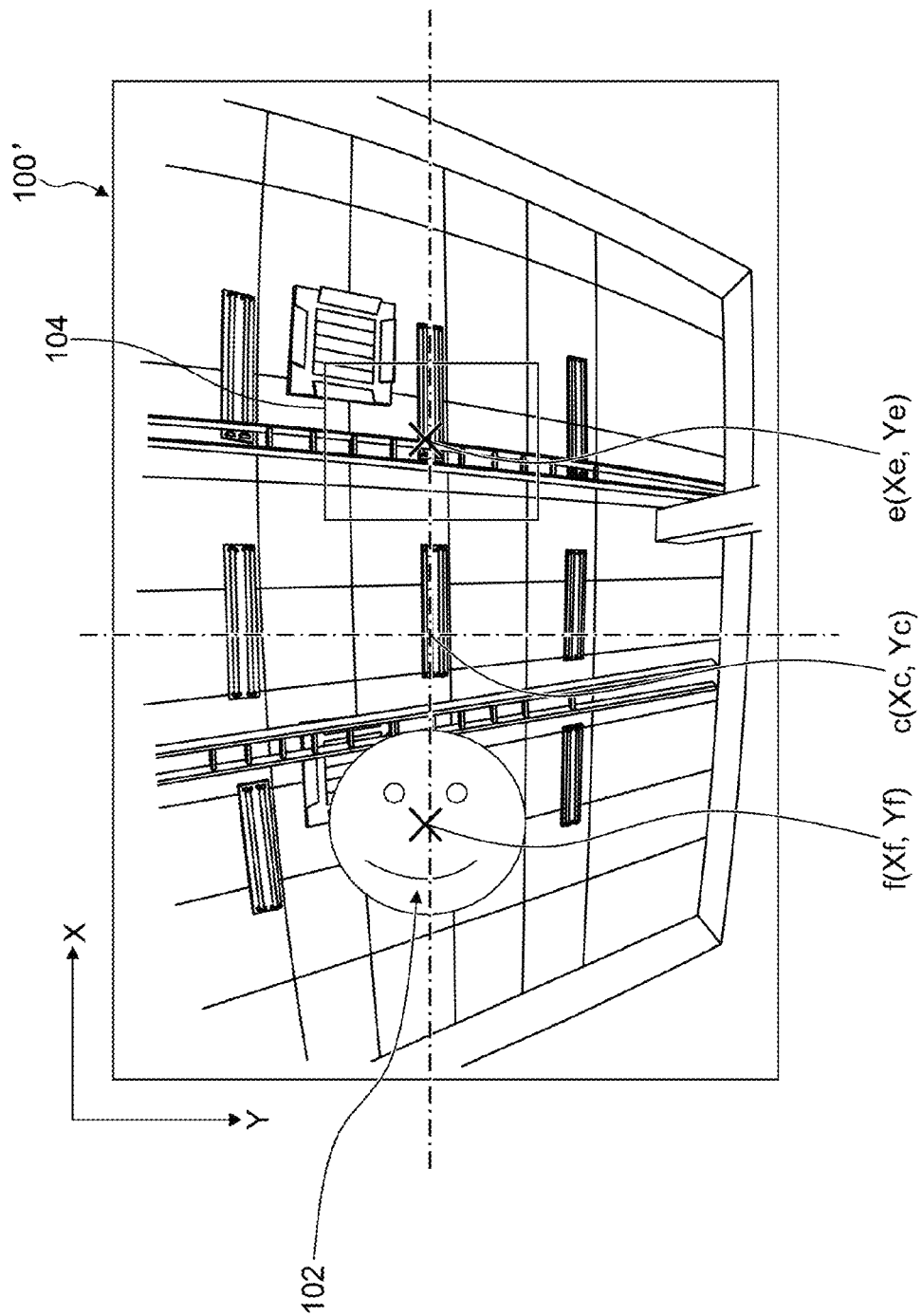
FIG. 11 is a diagram showing a relation between the position of an observer and a glare range on the taken image by the camera when the observer observes a display image displayed on a display of the mobile terminal.

When the image is taken by the camera 60 in a state in which the observer is observing the display image of the display 20, the taken image 100' after the distortion correction process that contains the face image 102 of the observer is obtained as shown in FIG. 11.

A widely known face detection process is performed to the taken image 100', and the face image 102 of the observer is detected. Then, the position of the face image in the taken image 100' is detected. Here, assuming that two-dimensional coordinates (x, y) in which the abscissa is the X-axis and the ordinate is the Y-axis are assigned to the respective pixels of the taken image 100' (the respective points on the image surface), the coordinates (Xf, Yf) of the center position f of the face image 102 in the taken image 100' is determined, and the center position f is detected as the position f (the position of the eyes) of the face image of the observer. Here, in the face detection process, it is possible to know the position of the eyes also, and therefore, the position of the eyes (a middle position between the left and right eyes, or the like) may be adopted as the reference for the position f of the face image. After the above face detection process finishes, the transition to the process in step S16 in FIG. 9 is performed.

In step S16, the CPU 80 acquires the result of the above face detection process from the camera image analysis unit 72, and performs a decision process of whether the face image of the observer has been detected. In this decision process, in the case of a situation in which the face image of the observer cannot be specified, for example, in the case where the face image has not been detected in the face detection process in step S14, or in the case where multiple face images have been detected, the decision that the face image of the observer has not been detected is made, and the decision of an error is made. Then, in the case of deciding that the face image has been adequately detected, the transition to step S18 is performed. In the case of the decision of the error, the return to the process in step S12 is performed, and the restart from the process in step S12 is performed.

Here, in the case where the decision of the error is made in the step S16 when the display brilliance correction process described later has been already performed in step S22 described later, the display brilliance correction process (reflection unevenness suppression process) may be performed using a parameter used in the display brilliance correction process that was performed last time, with no change. Alternatively, the reflection brilliance distribution of the outside light on the display surface 34 that is determined in step S20 may be regarded as 0, and the display brilliance correction process in step S22 may be performed using a moving average from a reflection brilliance distribution determined last time.

In step S18, a glare range specifying process in which a glare range glaring on the display surface 34 as a glare image is specified from the taken image brought in step S12 based on the position f of the face image of the observer detected in step S14 is performed by glare range specifying means included in the camera image analysis unit 72.

Figure 12:
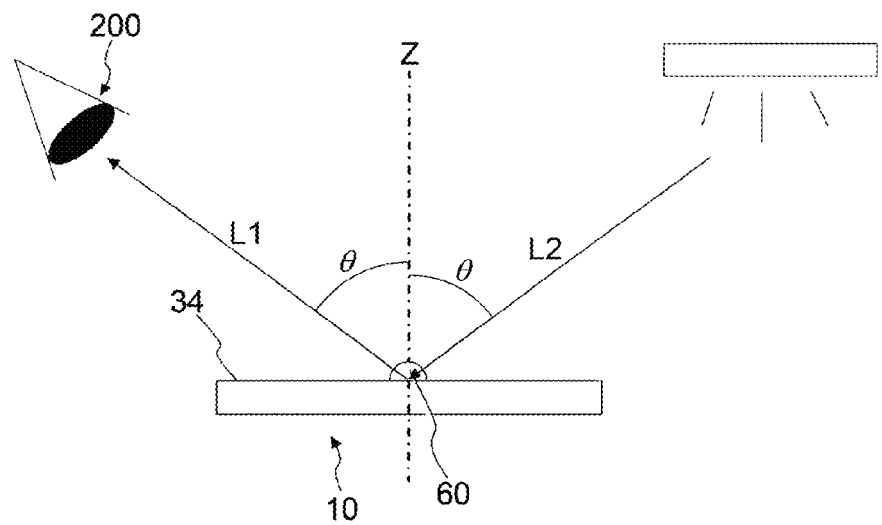
FIG. 12 is a diagram showing a positional relation between the position of the observer (the eyes) and a display surface when the observer observes the display image displayed on the display of the mobile terminal.

The glare range specifying process is explained in detail. First, it is assumed that as shown in FIG. 12, the camera 60 is disposed at the center position on the display surface 34 and FIG. 11 shows the taken image 100' taken by the camera 60 disposed at the position. In that case, it is assumed that the Z-axis is an axis that is through the center position on the display surface 34 and that is orthogonal to the display surface 34. An object point intersecting with the Z-axis on the side opposite to the display surface 34 (hereinafter, referred to as an object point in a direction orthogonal to the center position on the display surface 34) glares at the center position c (coordinates (Xc, Yc)) on the image surface of the taken image 100' in FIG. 11.

Here, this case is a case where the optical axis of the camera 60 is parallel to the direction orthogonal to the display surface 34. However, in the case where the optical axis of the camera 60 is different from the direction orthogonal to the display surface 34, the object point in the direction orthogonal to the center position on the display surface 34 glares as an image point at a position different from the center position c on the taken image. In that case, it is only necessary to determine in advance the position of the image point from the design information about the mobile terminal 10 and the like, to regard the position of the image point as the center position (symmetric point) c on the taken image 100', and to apply subsequent processes.

Meanwhile, in FIG. 12, when the angle between a visual line L1 connecting the eyes of the observer and the center position (symmetric position) on the display surface 34, and the Z-axis is θ, an object point on a straight line L2 that is symmetric to the visual line L1 with respect to the Z-axis, that is, an object point on a straight line L2 that is on a plane containing the Z-axis and the visual line L1 and that intersects with the center position on the display surface 34 at the angle θ from the side opposite to the visual line with respect to the Z-axis glares at the center position (symmetric position) on the display surface 34, as a glare image. This object point glares at the center position e of the glare range 104 on the taken image 100' in FIG. 11 taken by the camera 60, and the coordinate value (Xe, Ye) of the center position e of the glare range 104 is determined as a point that is symmetric to the position f (Xf, Yf) of the face image with respect to the center position c (Xc, Yf) on the taken image 100'. That is, the center position e (Xe, Ye) of the glare range 104 can be determined as a point that satisfies the relation of the following formulas (1) and (2).

$$|Xe-Xc|=|Xf-Xc| \quad (1)$$

$$|Ye-Yc|=|Yf-Yc| \quad (2)$$

Then, when the center position e (Xe, Ye) of the glare range 104 is determined, the glare range 104 whose center is the center position e (Xe, Ye) and that corresponds to the shape and size of the display surface 34 can be determined as FIG. 11. On this occasion, the pixel number and focal distance of the camera 60 are also considered.

Figure 13:
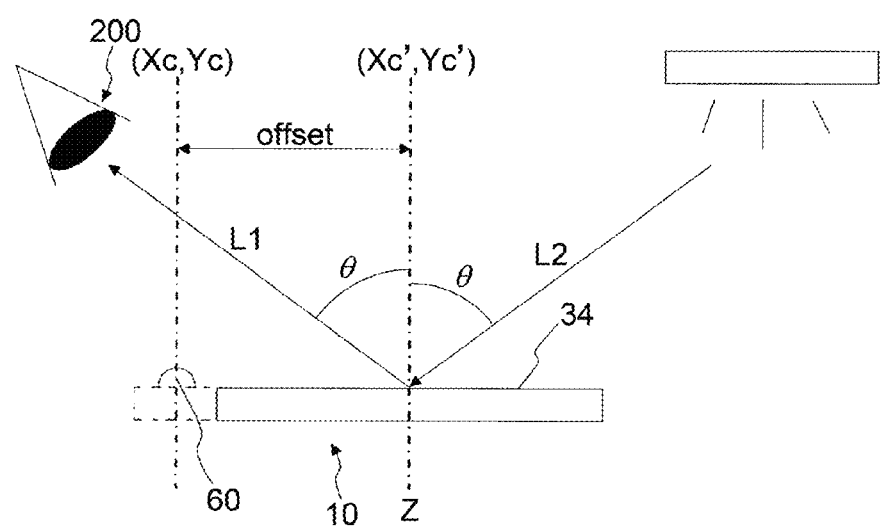
FIG. 13 is a diagram that is used for the explanation of the determination of the glare range in consideration of the offset amount between the position of the camera and the center position on the display surface and that shows a positional relation between the position of the observer (the eyes) and the display surface when the observer observes the display image displayed on the display of the mobile terminal.

Here, actually, the camera 60 is not disposed at the center position on the display surface 34 as shown in FIG. 12, but is disposed near the outside of the display surface 34 as shown in FIG. 13. Therefore, the center position c (Xc, Yc) on the taken image taken by the camera 60 is not a position where the object point in the direction orthogonal to the center position on the display surface 34 glares, but a position where an object point in the direction orthogonal to the position of the camera 60 glares.

In the case of correcting such a deviation between the position of the camera and the center position on the display surface 34, it is only necessary to determine a position c' (coordinates (Xc', Yc')) on the taken image where the object point in the direction orthogonal to the center position on the display surface 34 glares, and to perform the correction using the coordinates (Xc', Yc') instead of the coordinates (Xc, Yc) used in the above formulas (1) and (2).

That is, the position c' (Xc', Yc') is expressed by the following formulas (3) and (4).

$$Xc'=Xc+X\text{offset} \quad (3)$$

$$Yc'=Yc+Y\text{offset} \quad (4)$$

On this occasion, the center position e (Xe, Ye) of the glare range can be determined as a point that satisfies the relation of the following formulas (1)' and (2)'.

$$|Xe-Xc'|=|Xf-Xc'| \quad (1)'$$

$$|Ye-Yc'|=|Yf-Yc'| \quad (2)'$$

Figure 14:
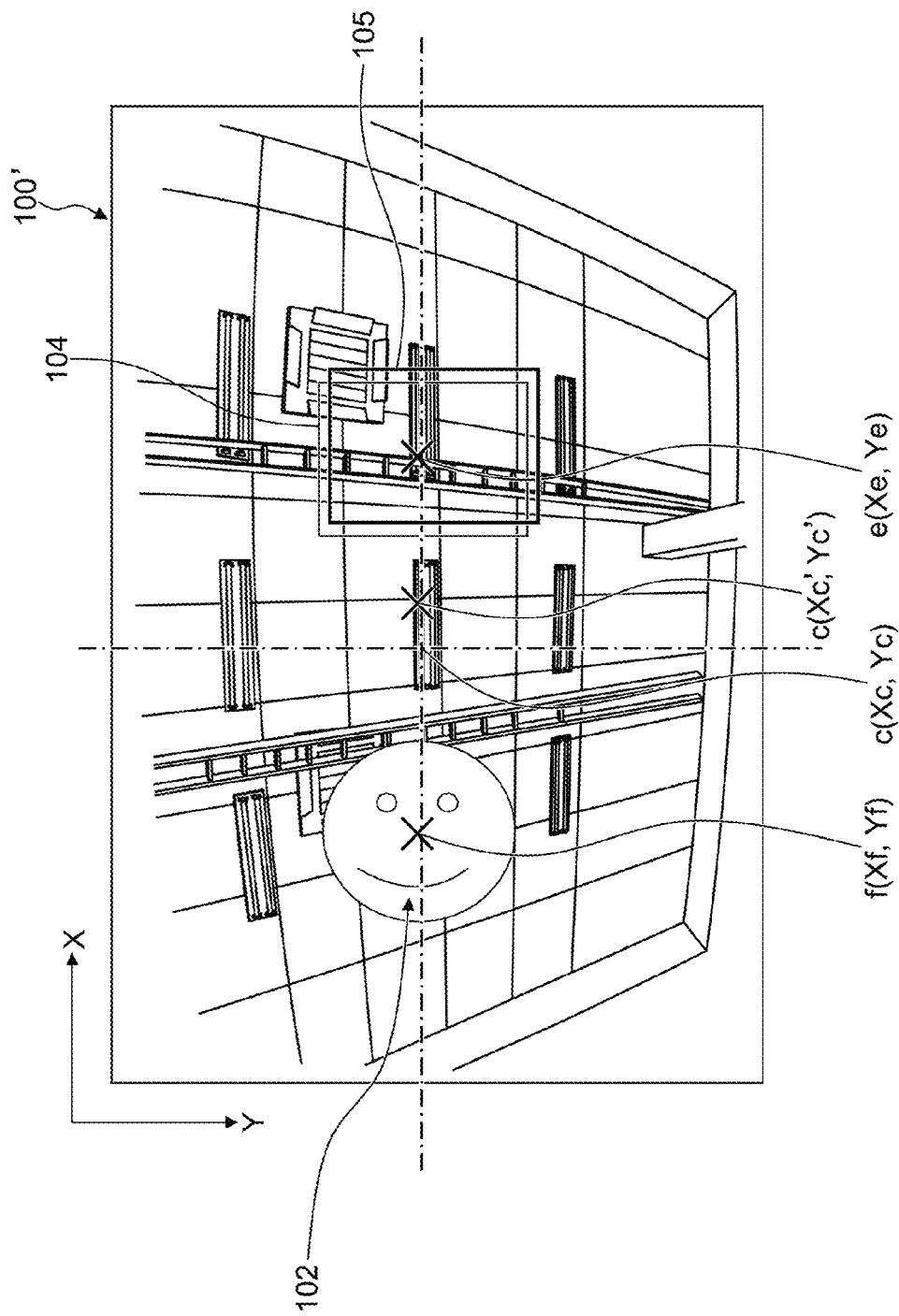
FIG. 14 is a diagram that is used for the explanation of the determination of the glare range in consideration of the offset amount between the position of the camera and the center position on the display surface and that shows a relation between the position of the observer and the glare range on the taken image by the camera when the observer observes the display image displayed on the display of the mobile terminal.

The values of Xoffset and Yoffset indicating the offset amounts in the X-axis direction and Y-axis direction can be determined based on the pixel number and focal distance of the camera 60 and the positional relation between the display surface 34 and the camera 60. As shown in FIG. 14, a glare range 105 to be determined by such a correction is slightly deviated from the glare range 104 with no correction, which is on the assumption that the camera 60 is disposed at the center position on the display surface 34. Here, the glare range may be determined from the above formulas (1) and (2), by converting the taken image taken by the camera 60 disposed at the actual position, into a taken camera taken by a camera 60 that is assumed to be disposed at the center position on the display surface 34. Further, when the deviation of the glare range due to the deviation between the position of the camera 60 and the center position on the display surface 34 is very slight, it is not necessarily required to perform such a correction of the glare range.

After the above glare range specifying process finishes, the transition to step S20 in FIG. 9 is performed.

Figure 15:
FIG. 15 is a diagram of an image in the glare range that glares as a glare image on the display surface and that is extracted from the taken image by the camera.

In step S20, a reflection brilliance estimation process in which an image in the glare range specified in the above way is extracted as FIG. 15, and the brilliance distribution of the glare image that the observer visually recognizes on the display surface 34, that is, the reflection brilliance distribution by the reflection of the outside light on the display surface 34 is estimated (calculated) is performed by reflection brilliance estimation means included in the camera image analysis unit 72 (the reflection brilliance estimation device).

Here, the position on the display surface 34 where each pixel of the image in the glare range glares can be determined by adapting the longitudinal and lateral lengths of the image in the glare range to the actual longitudinal and lateral lengths of the display surface 34. The position of each pixel i (i is a positive integer) of the image in the glare range corresponds to each position i on the display surface 34 where each pixel i glares, as the corresponding position.

First, when the brilliance value of each pixel i of the image in the glare range is represented by Yi, the object brilliance Bi is calculated by the following formula (5).

$$Bi=Yi \times f(\gamma) \times (\alpha \times F^2/S \times T) \quad (5)$$

where
α: coefficient (a constant determining the intensity of the correction)
F: diaphragm value
S: ISO sensitivity
T: shutter speed When the specular reflectivity of the display surface 34 is represented by r, the reflection brilliance Ri of the outside light at each position i on the display surface 34 where each pixel i glares is calculated by the following formula (6).

$$Ri=Bi \times r \quad (6)$$

Thereby, the reflection brilliance Ri by the reflection of the outside light at each position i on the display surface 34 is calculated based on the brilliance value of each pixel i at the corresponding position, and the reflection brilliance distribution indicating the reflection brilliance of each point on the display surface 34 is determined.

Here, in the case where the taken image obtained by the camera 60 is a color image, it is only necessary to regard, as one pixel, a set of pixels that is composed of adjacent R, G and B pixels and that expresses one color, and to determine the brilliance (brilliance value) of the pixel regarded as one, by the weighted average or the like, based on the pixel value of each pixel of a set of R, G and B. In the case where the taken image is a monochrome image, it is only necessary to adopt the pixel value of each pixel as the brilliance value.

Further, at the time of the image taking by the camera 60 in step S12, an image in the case where the exposure is in a proper condition (in the case of a proper exposure) and an image in the case of an under-condition (in the case of an exposure lower than the proper exposure) may be alternately taken. Then, a taken image taken in the proper condition may be used for the face detection process in step S14, and a taken image taken in the under-condition may be used for the calculation of the reflection brilliance distribution in the step S20. Thereby, it is possible to avoid a situation in which blown-out highlights occur in an object with not less than a certain brilliance and the reflection brilliance distribution cannot be accurately calculated.

Furthermore, the past data of the reflection brilliance distribution calculated in the above way may be stored for a certain period of time, and a reflection brilliance distribution determined by the moving average or the like based on those data may be adopted as the current reflection brilliance distribution. It is possible to prevent a situation in which a hunting occurs when the relative position among the observer, the display surface 34 and the light changes intermittently.

After the reflection brilliance estimation process finishes, the transition to the process in step S22 is performed.

In step S22, a display brilliance correction process in which the display brilliance of the display image to be displayed on the display 20 is corrected based on the reflection brilliance distribution on the display surface 34 determined in the above way is performed by display brilliance correction means included in the CPU 80 (the display brilliance correction device). Thereby, the reflection unevenness on the display surface 34 is suppressed. Here, the detail of the display brilliance correction process in the step S22 is described later. After the display brilliance correction process in step S22 finishes, the transition to step S24 is performed.

In step S24, the decision process of whether an operation for turning off the power has been performed by the CPU 80 is performed. In the case of deciding that the operation for turning off the power has not been performed in this decision process, the return to the process in step S12 is performed, and the processes from step S12 are repetitively executed.

In the case of judging that the operation for turning off the power has been performed, the transition to step S26 is performed. Then, a process for finishing is performed, the power is turned off, and the reflection unevenness suppression process in the flowchart finishes.

Next, the display brilliance correction process in step S22 is explained in detail.

First, the display brilliance of the display image to be displayed on the display 20 is explained. The display image to be displayed on the display 20 is given from the CPU 80 or the like to the picture signal generation unit 40 as the input picture signal (corresponding to the input image). In the picture signal generation unit 40, the input picture signal, to which processes such as a display characteristic conversion are performed in accordance with instructions from the CPU 80, is converted into a picture signal in a format corresponding to the control of the LCD panel 22, and is input to the LCD drive circuit 42. Then, in accordance with the picture signal, the LCD drive circuit 42 controls the light transmittances for the respective pixels of the LCD panel 22, and controls the display brilliances of the respective pixels of the display image to be displayed on the LCD panel 22.

Further, back light (illumination light) is emitted to the back surface side of the LCD panel 22. The back light is generated by the multiple white LEDs 26 of the back light unit 24. The light-emitting brilliances of the respective white LEDs 26 can be individually controlled, and an instruction to designate the individual light-emitting brilliances is given from the CPU 80 to the back light control signal generation unit 50. The back light control signal generation unit 50 generates control signals for controlling the light-emitting brilliances of the respective white LEDs 26 in accordance with the instruction from the CPU 80, and outputs the control signals to the LED driver. Then, in accordance with the control signals, the LED driver controls the light-emitting brilliances of the respective white LEDs 26 of the back light unit 24. Since the light-emitting brilliances of the respective white LEDs 26 are individually controlled in this way, it is possible to alter the back light brilliances of the LCD panel 22 on a pixel basis, and it is possible to control the display brilliances of the respective pixels of the display image to be displayed on the LCD panel 22.

Therefore, the display brilliances of the respective pixels of the display image to be displayed on the LCD panel 22 (they are the display brilliances of the respective pixels of the LCD panel 22 that do not include the reflection brilliances on the display surface 34, and are referred to as "panel display brilliances", hereinafter) can be controlled by the light transmittances for the respective pixels of the LCD panel 22, and the back light brilliances for the respective pixels of the LCD panel 22 that depend on the light-emitting brilliances of the respective white LEDs 26 of the back light unit 24.

Here, in the case where the LCD panel 22 includes color filters for displaying a color image, for example, it is only necessary to regard, as one pixel, one set of pixels that is composed of adjacent R, G and B pixels and that expresses one color, and to adopt a value to be determined by the weighted average or the like of the respective brilliances of the R, G and B pixels of the one set of pixels, as the display brilliance (brilliance value) of the above one set of pixels regarded as one pixel. On this occasion, in the control of the display brilliance of each pixel of the display image, the light transmittance and back light brilliance of each pixel of the LCD panel 22 indicate the light transmittance and back light brilliance of the pixel regarded as one, and controlling (setting) the pixel regarded as one to the light transmittance means controlling the light transmittances for the respective pixels of the one set of R, G and B such that they are matched with a display brilliance at the light transmittance for the pixel regarded as one, and controlling the light transmittances for the respective pixels such that they have a ratio according to the color information to be expressed by the one set of R, G and B pixels. Further, controlling (setting) the back light brilliance for the pixel regarded as one to a predetermined brilliance means controlling uniformly the back light brilliances for the respective pixels of the one set of R, G and B to the predetermined brilliance.

In the case where the LCD panel 22 displays a monochrome image, it is possible to control the display brilliance for each pixel, by the light transmittance and back light brilliance for each pixel.

Furthermore, a region composed of multiple pixels may be regarded as one pixel, and a value (an average or the like) to be calculated based on the brilliances of the respective pixels in the region may be adopted as the display brilliance (brilliance value) in the above region regarded as one pixel.

In the case where the back light unit 24 regards multiple pixels of the LCD panel 22 as one region and controls the back light brilliance for each region, it is only necessary to define the brilliance in the region in this way and to apply the control for each pixel explained later as the control for each region.

The display brilliance control in the ordinary display in which the reflection unevenness suppression process is not performed is explained. In the ordinary display, the respective white LEDs 26 of the back light unit 24 are set to an identical light-emitting brilliance, and the back light is emitted to the whole surface of the LCD panel 22 at a uniform brightness. When the whole of the LCD panel 22 (the whole of the display image) is brightened or darkened by a user operation, the surrounding brightness or the like, the alteration is performed while the light-emitting brilliances of all the white LEDs 26 are kept at an identical light-emitting brilliance, and the back light brilliances for all the pixels are uniformly increased or decreased. Therefore, in the ordinary display, only the light transmittances for the respective pixels of the LCD panel 22 are controlled depending on the signal values of the input picture signals, and the display image is displayed on the LCD panel 22.

FIGS. 16A to 16C are diagrams relevant to a display brilliance control in the ordinary display. FIG. 16A shows a relation between the signal value X of the input picture signal that is input to the picture signal generation unit 40 and that indicates the brilliance value of each pixel of the display image to be displayed on the display 20, and the light transmittance T for each pixel of the LCD panel 22 that is controlled, based on the signal value X, by the picture signal to be output from the picture signal generation unit 40. FIG. 16B shows a relation between the signal value X of the input picture signal and the back light brilliance BL for each pixel of the LCD panel 22 that is controlled by the control signal to be output from the back light control signal generation unit 50. FIG. 16C shows a relation between the signal value X of the input picture signal and the panel display brilliance DB.

As shown in FIG. 16A, in the ordinary display, the light transmittance T is controlled in accordance with a previously determined characteristic curve TC, and the light transmittance T is controlled such that a greater signal value X (a pixel with a greater signal value), which is between the minimum value Xmin and maximum value Xmax of the signal value X of the input picture signal, increases the light transmittance T of the LCD panel 22 and increases the display brilliance.

The display brilliance of each pixel of the LCD panel 22 for the light transmittance T of the LCD panel 22 that is controlled in accordance with such a characteristic curve TC, that is, the panel display brilliance DB changes depending on the back light brilliance BL. In the ordinary display, the back light brilliances BL for all the pixels of the LCD panel 22 are set to an identical brilliance, and as shown in FIG. 16B, regardless of the signal value X of the input picture signal, the back light brilliances BL are set to a fixed brilliance BL0 in accordance with a characteristic curve BLC (straight line). When the whole screen is brightened or darkened, the back light brilliances BL for all the pixels of the LCD panel 22 are uniformly shifted in the rising direction or in the lowering direction, and the characteristic curve BLC is altered into a characteristic curve BLC' (straight line) or a characteristic curve BLC'' (straight line).

The panel display brilliance of each pixel of the LCD panel 22 is a value resulting from multiplying the light transmittance T and the back light brilliance BL, and therefore, as shown in FIG. 16C, the characteristic curve DBC of the panel display brilliance DB is a characteristic curve DBC in which the whole of the characteristic curve TC of the light transmittance T in FIG. 16A is expanded or shrunk in the longitudinal direction at a multiplying factor corresponding to the back light brilliance BL. In accordance with this characteristic curve DBC, the panel display brilliance DB of each pixel of the LCD panel 22 is controlled (altered) with respect to the signal value X of the input picture signal for each pixel.

In the case where the back light brilliance BL is controlled in accordance with the characteristic curve BLC (back light brilliance BL0) in FIG. 16B and the panel display brilliance DB is controlled in accordance with the characteristic curve DBC in FIG. 16C, the characteristic curve DBC of the panel display brilliance DB shifts, as the characteristic curve DBC', at the same rate as the increasing rate of the back light brilliance BL, in a direction in which the panel display brilliance DB is raised, when the back light brilliance BL is raised as the characteristic curve BLC' (when the screen is brightened). On the other hand, when the back light brilliance BL is lowered as the characteristic curve BLC'' (when the screen is darkened), the characteristic curve DBC of the panel display brilliance DB shifts, as the characteristic curve DBC'', at the same rate as the decreasing rate of the back light brilliance BL, in a direction in which the panel display brilliance DB is lowered.

Further, when the signal value X is the maximum value Xmax, the panel display brilliance DB is controlled so as to become the maximum value DBmax. In the case where the maximum value Tmax of the light transmittance T when the signal value X is the maximum value Xmax is 100 percent (the numerical value is 1.0), the maximum value DBmax is equal to the back light brilliance BL0.

Here, the display brilliance correction process explained below can be regarded as a process in which the correction (alteration) is performed to the panel display brilliance DB in the ordinary display, and the correction amount varies depending on the back light brilliance BL in the ordinary display. In the above explanation, reference character BLC designating the characteristic curve of the back light brilliance BL is altered depending on the value of the back light brilliance BL, and also, reference character DBC for the characteristic curve of the panel display brilliance DB depending on that is altered and shown. However, the brilliance BL0 of the characteristic curve BLC of the back light brilliance BL, itself, is not limited to a particular value. Therefore, when the back light brilliance BL in the ordinary display is altered, the value of the brilliance BL0 of the characteristic curve BLC is altered, the back light brilliance BL in the ordinary display is controlled in accordance with the characteristic curve BLC, and the panel display brilliance DB is controlled in accordance with the characteristic curve DBC.

Meanwhile, in the above display brilliance control in the ordinary display, when the glare of the outside light (glare image) due to the reflection of the outside light on the display surface 34 occurs, the observer observes, as the display brilliance of the display image, a brilliance resulting from adding the panel display brilliance DB that is the display brilliance of the display image displayed on the LCD panel 22 and the reflection brilliance R of the outside light on the display surface 34 between the corresponding positions.

Here, the positions of the respective points (the respective pixels) of the display image (on the image surface) to be displayed on the LCD panel 22 correspond to the positions of the respective points (the respective pixels) on the LCD panel 22 (on the image display surface) on which the respective pixels of the display image are displayed, as the corresponding positions. The positions of the respective pixels of the LCD panel 22 correspond to the positions of the respective points on the display surface 34 (on the front surface of the display 20), as the corresponding positions, which are positions overlapping in the perpendicular direction with respect to the display surface 34. Further, the positions of the respective pixels of the display image correspond to the positions of the respective points on the display surface 34, as the corresponding positions, which are positions with corresponding positional relations to identical positions on the LCD panel 22. In the explanation of the embodiment, a brilliance at the corresponding positions on those respective surfaces is sometimes described as a brilliance at the position (point, position, pixel or the like) on an actually different surface. However, what surface involves the brilliance is obvious from the name (the panel display brilliance, the reflection brilliance, the mixed display brilliance or the like) assigned to the brilliance, and therefore, it is assumed that the brilliance at the corresponding position on a surface in accordance with it is described.

Further, hereinafter, the brilliance resulting from adding the panel display brilliance DB on the LCD panel 22 and the reflection brilliance R on the display surface 34 between the corresponding points, which is referred to as the "mixed display brilliance", is discriminated from the panel display brilliance DB.

Figure 17A:
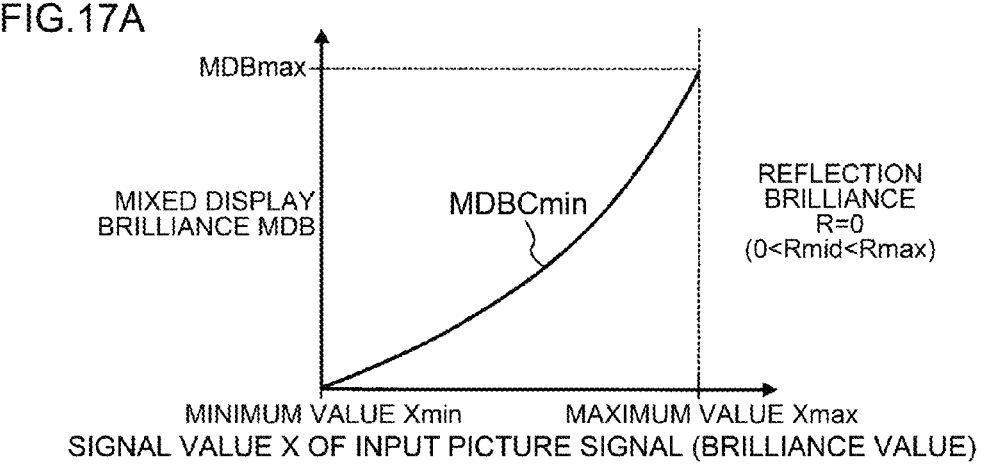
FIG. 17A is a diagram showing a relation between the signal value of an input picture signal and the mixed display brilliance in the ordinary display.
Figure 17B:
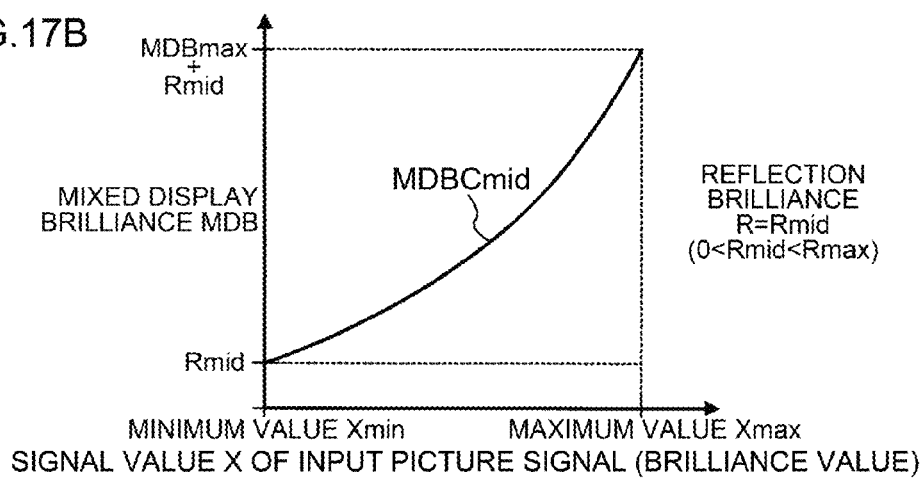
FIG. 17B is another diagram showing a relation between the signal value of the input picture signal and the mixed display brilliance in the ordinary display.
Figure 17C:
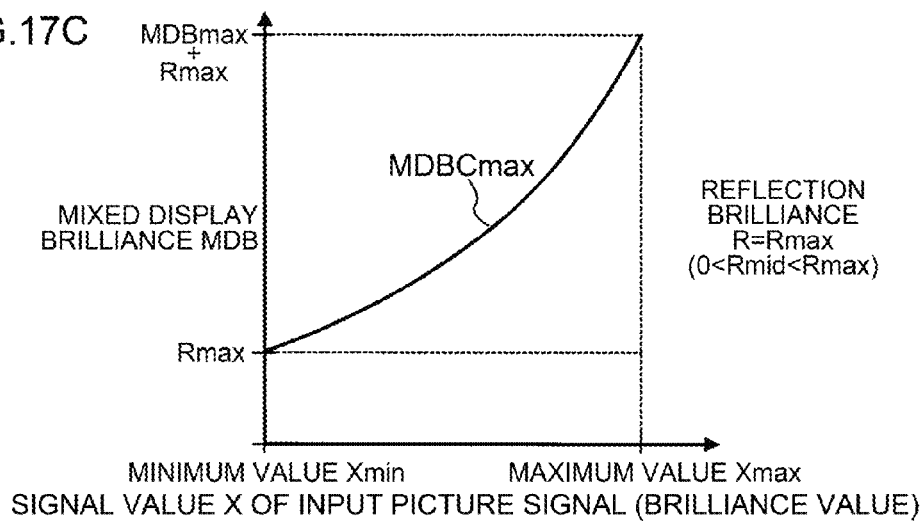
FIG. 17C is another diagram showing a relation between the signal value of the input picture signal and the mixed display brilliance in the ordinary display.

FIG. 17A to FIG. 17C are diagrams showing relations between the signal value X of the input picture signal and the mixed display brilliance MDB in the ordinary display. FIG. 17A is a diagram showing the relation at a point (pixel) on the display surface 34 where the reflection brilliance R of the outside light is 0, FIG. 17C is a diagram showing the relation at a point (pixel) where the reflection brilliance R is the maximum value Rmax of the whole of the display surface 34, and FIG. 17B is a diagram showing the relation at a point (pixel) where the reflection brilliance R is a middle value Rmid of 0 to the maximum value Rmax.

As shown in FIG. 17A, at the point where the reflection brilliance R is 0, in accordance with a characteristic curve MDBCmin equal to the characteristic curve DBC of the panel display brilliance DB shown in FIG. 16C, the mixed display brilliance MDB varies depending on the signal value X of the input picture signal. Further, the maximum value MDBmax of the mixed display brilliance MDB when the signal value X is the maximum value Xmax is also equal to the maximum value DBmax of the panel display brilliance DB shown in FIG. 16C.

In contrast, as shown in FIG. 17B and FIG. 17C, the points where the reflection brilliance R is not 0 have characteristic curves MDBCmid and MDBCmax in which the whole of the characteristic curve MDBCmin in FIG. 17A (that is, the characteristic curve DBC in FIG. 16C) is shifted in the rising direction by the reflection brilliances R, and the mixed display brilliances MDB for the respective signal values X are raised by the reflection brilliances R, compared to the point where the reflection brilliance is 0.

That is, when the characteristic curve DBC is expressed by a function DBC(X) with respect to the signal value X, and the characteristic curve of the mixed display brilliance MDB is expressed by a function MDBC(X) with respect to the signal value X, the following formula (7) holds.

Mixed Display Brilliance $MDB$=Panel Display Brilliance $DB$+Reflection Brilliance $R$ (7)

Therefore, the characteristic curve MDBC(X) is expressed by the following formula (8).

$MDBC(X)=DBC(X)+R$ (8)

In the relational formula (8), the characteristic curves MDBCmin, MDBCmid and MDBCmax show curves when the R in the characteristic curve MDBC(X) is R=0, R=Rmid and R=Rmax, respectively.

Figure 18A:
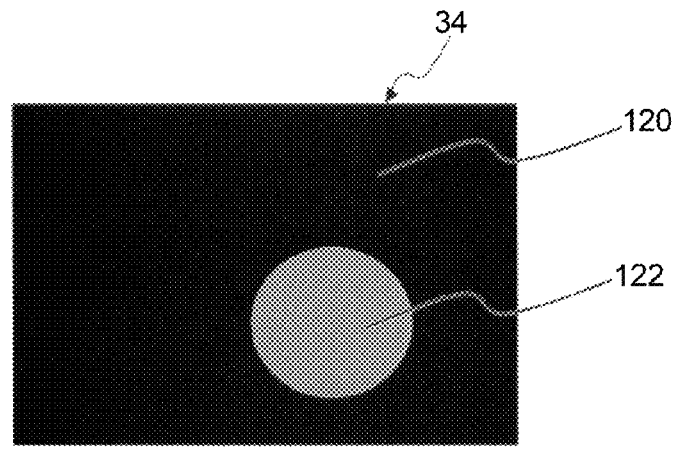
FIG. 18A is a diagram showing an appearance of a reflection unevenness in the ordinary display.

Therefore, in the case of the display brilliance control in the ordinary display, the observer observes, with respect to the signal value X of the input picture signal, the display image with the mixed display brilliance MDB in accordance with the characteristic curve MDBC(X), which varies depending on the reflection brilliances R at the respective positions on the display surface 34. For example, suppose that, as shown in FIG. 18A, the display surface 34 has a reflection brilliance distribution composed of a low brilliance region 120 where the reflection brilliance R is a low brilliance (for example, 0) and a high brilliance region 122 where the reflection brilliance R is a high brilliance (R>0).

Figure 18B:
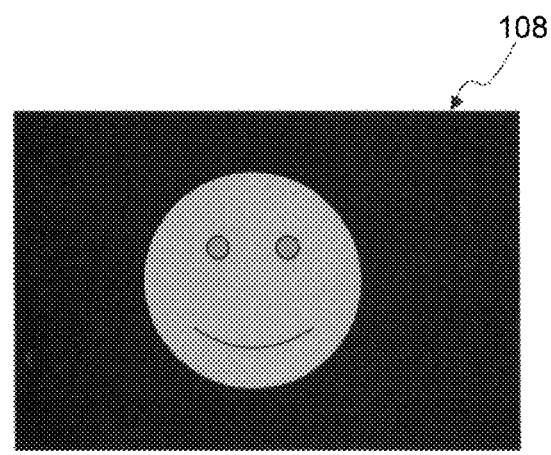
FIG. 18B is another diagram showing an appearance of a reflection unevenness in the ordinary display.
Figure 18C:
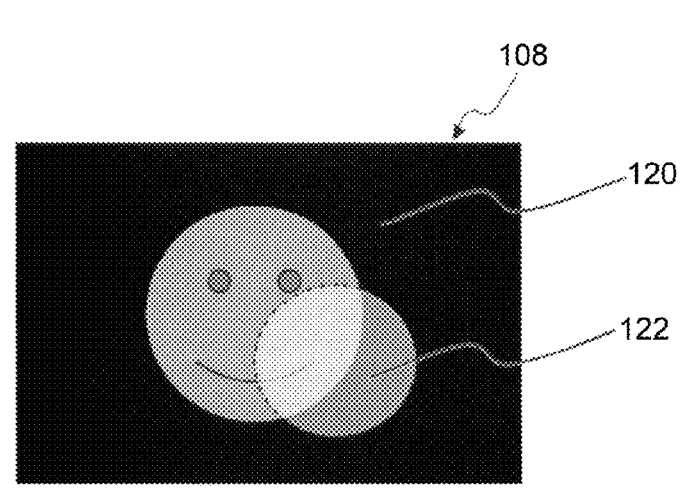
FIG. 18C is a diagram showing an appearance of a reflection unevenness in the ordinary display.

On this occasion, if a display image 108 shown in FIG. 18B is displayed on the LCD panel 22 in accordance with the characteristic curve DBC(X) of the panel display brilliance DB in the ordinary display, a display image 108 shown in FIG. 18C is observed.

Thereby, the light-emitting brilliance is offset in the high brilliance region for the reflection brilliance R, resulting in a so-called black float image. On the other hand, in the low brilliance region (R=0) for the reflection brilliance R, the image has an ordinary gradation characteristic. Therefore, even when the display image is originally flat, the region where the outside light is reflected appears bright so that it is visually recognized as a reflection unevenness. Thereby, the visibility of the display image is degraded.

Hence, in the display brilliance correction process according to the embodiment, the panel display brilliance DB of the LCD panel 22 for the display brilliance control in the ordinary display is corrected such that the relation between the signal value X of the input picture signal and the mixed display brilliance MDB is controlled in accordance with a certain characteristic curve, regardless of the reflection brilliance R. Here, the display by the brilliance display control in which the display brilliance correction process is performed is referred to as the "correction display".

Figure 19A:
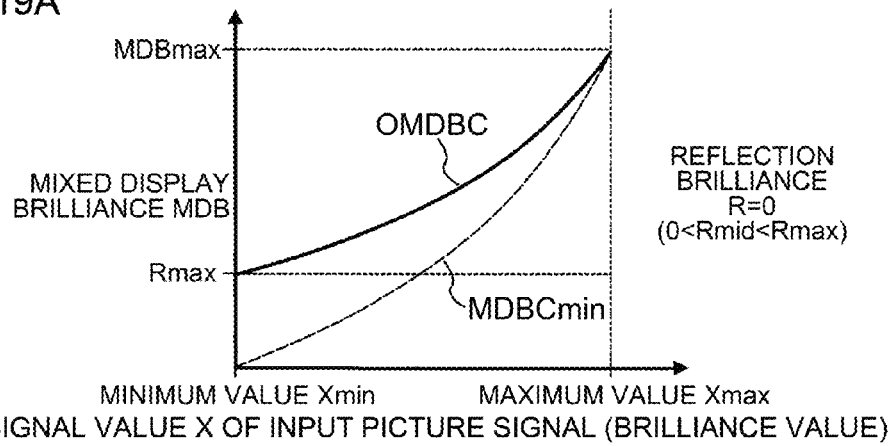
FIG. 19A is a diagram showing a relation between the signal value of the input picture signal and the mixed display brilliance in a correction display.
Figure 19B:
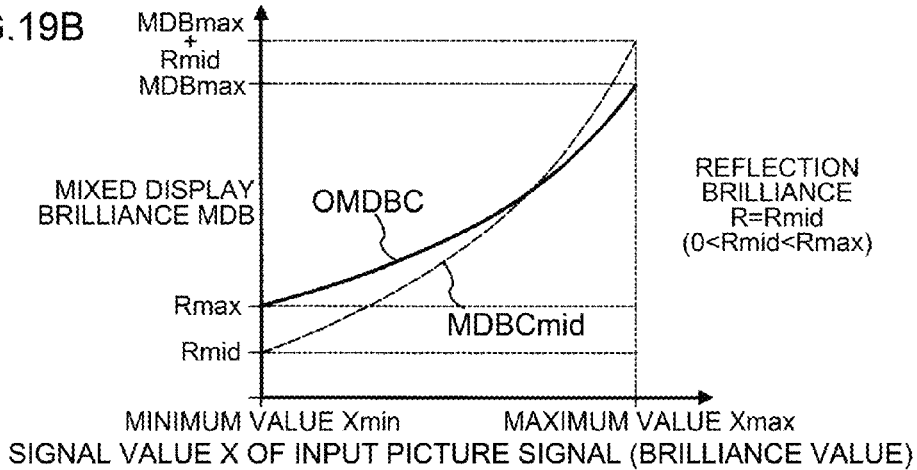
FIG. 19B is another diagram showing a relation between the signal value of the input picture signal and the mixed display brilliance in the correction display.
Figure 19C:
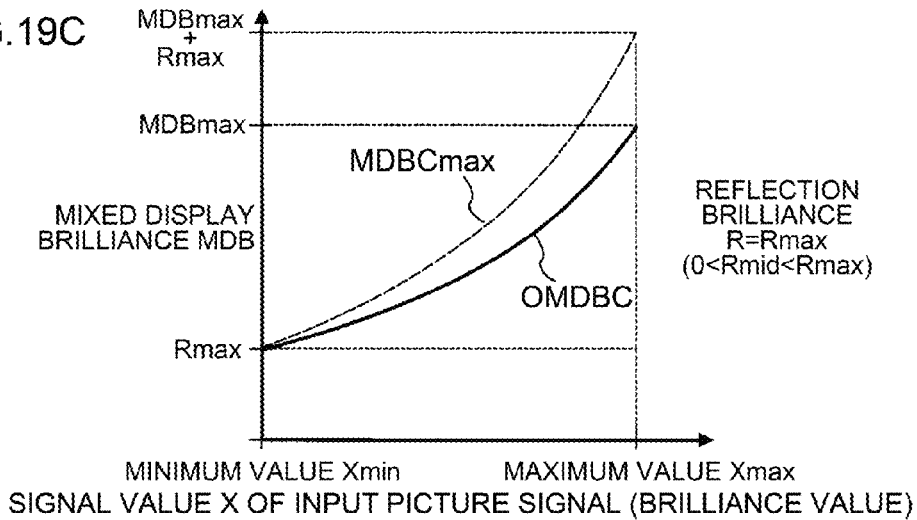
FIG. 19C is another diagram showing a relation between the signal value of the input picture signal and the mixed display brilliance in the correction display.

FIGS. 19A to 19C are diagrams showing relations between the signal value X of the input picture signal and the mixed display brilliance MDB, when the correction display is performed. Corresponding to FIGS. 17A to 17C, FIG. 19A is a diagram showing the relation at the point (pixel) where the reflection brilliance R is 0, FIG. 19B is a diagram showing the relation at the point (pixel) where the reflection brilliance R is the middle value Rmid of 0 to the maximum value, and FIG. 19C is a diagram showing the relation at the point (pixel) where the reflection brilliance R is the maximum value Rmax of the whole of the display surface 34.

As shown in these FIGS. 19A to 19C, in the display brilliance control in the correction display, regardless of the reflection brilliance R, the mixed display brilliance MDB with respect to the signal value X of the input picture signal is controlled in accordance with an identical characteristic curve OMDBC. For this, the panel display brilliance DB (back light brilliance BL×light transmittance T) of the display image to be displayed on the LCD panel 22 is corrected as described later.

Thereby, when the observer observes the display image displayed on the display 20, the gradation characteristic of the display brilliance of the display image including the reflection brilliance R is unified over the whole screen. Therefore, the display image observed as FIG. 18C in the ordinary display becomes, in the correction display, a display image in which the reflection unevenness is suppressed as FIGS. 25A, 25B, resulting in the achievement of the enhancement of the visibility.

In an example of the characteristic curve OMDBC in FIGS. 19A to 19C, the maximum value MDBmax of the mixed display brilliance MDB when the signal value X is the maximum value Xmax is the maximum value DBmax of the panel display brilliance DB in the ordinary display, and a variable range of the characteristic curve OMDBC is set in a range between the maximum value MDBmax and the maximum value Rmax of the reflection brilliance R on the whole of the display surface 34. Therefore, the dynamic range is compressed, relative to characteristic curves MDBCmin, MDBCmid and MDBCmax in the ordinary display shown in FIGS. 19A to 19C respectively. Here, the maximum value Rmax of the reflection brilliance R, which is determined based on the reflection brilliance distribution estimated by step S20 in FIG. 9, is the maximum value in the reflection brilliance distribution.

Here, the characteristic curve OMDBC to be set in this way is referred to as the objective characteristic curve OMDBC. The objective characteristic curve OMDBC is expressed by a function OMDBC(X) with respect to the signal value X, and a mixed display brilliance MDB controlled in accordance with the objective characteristic curve OMDBC(X) is particularly referred to as an objective mixed display brilliance OMDB. Further, a characteristic curve of the panel display brilliance DB for controlling the mixed display brilliance MDB in accordance with the objective characteristic curve OMDBC(X) is referred to as a correction characteristic curve CDBC. The correction characteristic curve CDBC is expressed by a function CDBC(X) with respect to the signal value X, and a panel display brilliance DB controlled in accordance with the correction characteristic curve CDBC(X) is particularly referred to as a correction panel display brilliance CDB.

On this occasion, from the above formula (7), the following formula (9) holds with respect to an arbitrary signal value X.

Objective Mixed Display Brilliance
  $OMDB$=Correction Panel Display Brilliance
  $CDB$+Reflection Brilliance $R$  (9)

From this formula (9), the following formula (10) holds.

Correction Panel Display Brilliance $CDB$=Objective
  Mixed Display Brilliance $OMDB$−Reflection
  Brilliance $R$  (10)

Therefore, the following formula (11) holds.

$CDBC(X)=OMDBC(X)-R$  (11)

These formulas (10) and (11) show that, for performing such a control that the mixed display brilliance MDB becomes the objective mixed display brilliance OMDB in accordance with the objective characteristic curve OMDBC(X), it is only necessary to control (correct) the panel display brilliance DB such that it becomes the correction panel display brilliance CDB, which results from subtracting the reflection brilliance R at each pixel from the objective mixed display brilliance OMDB determined for the signal value X of each pixel of the display image, and the correction characteristic curve CDBC(X) for controlling the panel display brilliance DB in that way only needs to be a curve that results from subtracting the reflection brilliance R from the objective characteristic curve OMDBC(X).

Figure 20A:
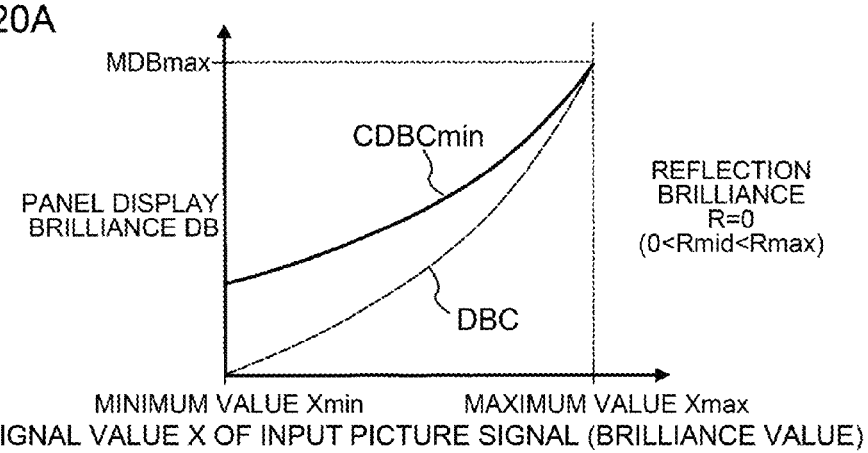
FIG. 20A is a diagram showing a relation between the signal value of the input picture signal and the panel display brilliance in the correction display.
Figure 20B:
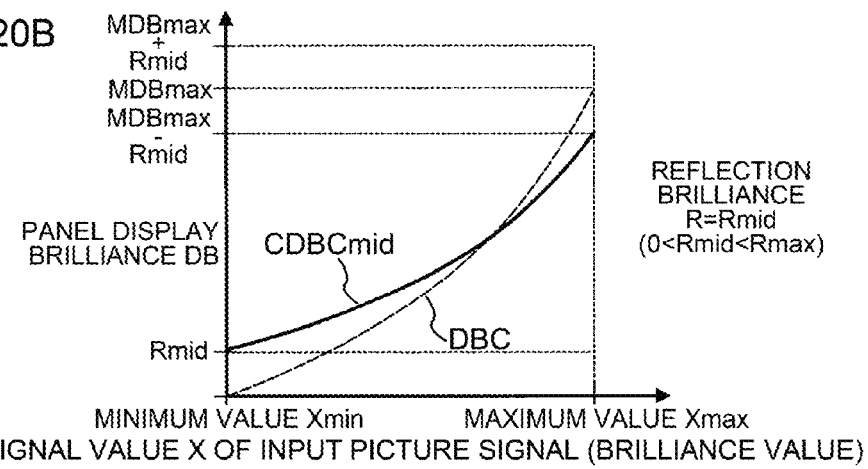
FIG. 20B is another diagram showing a relation between the signal value of the input picture signal and the panel display brilliance in the correction display.
Figure 20C:
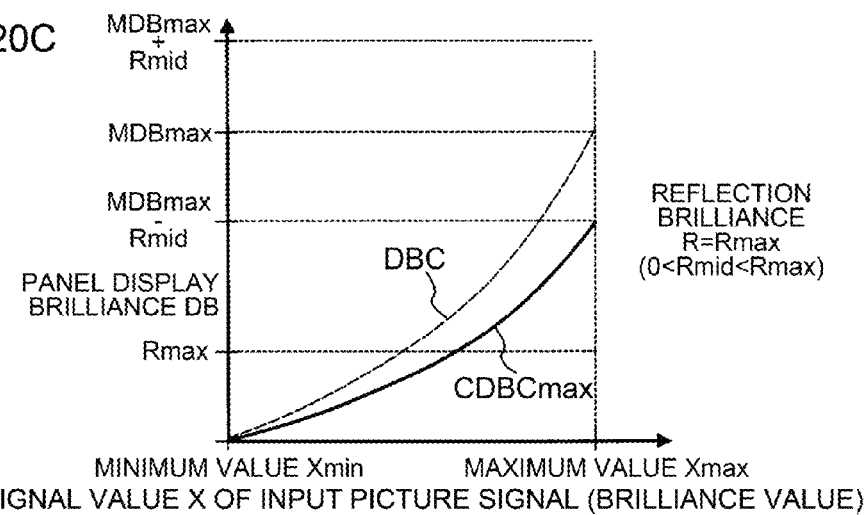
FIG. 20C is another diagram showing a relation between the signal value of the input picture signal and the panel display brilliance in the correction display.

FIGS. 20A to 20C, which are diagrams relevant to the display brilliance control in the correction display, show relations between the signal value X of the input picture signal and the panel display brilliance DB. Corresponding to FIGS. 19A to 19C, FIG. 20A is a diagram showing the relation at the point (pixel) where the reflection brilliance R is 0, FIG. 20B is a diagram showing the relation at the point (pixel) where the reflection brilliance R is the middle value Rmid of 0 to the maximum value, and FIG. 20C is a diagram showing the relation at the point (pixel) where the reflection brilliance R is the maximum value Rmax of the whole of the display surface 34.

In these figures, the above correction characteristic curve CDBC(X) is shown as correction characteristic curves CDBCmin, CDBCmid and CDBCmax that are different in the reflection brilliance R, and the panel display brilliance DB (correction panel display brilliance CDB) in the correction display is controlled in accordance with these correction characteristic curves CDBCmin, CDBCmid and CDBCmax that depend on the reflection brilliance R.

As can be seen from the comparison with FIG. 19A to FIG. 19C, and as is obvious from the above formula (11) also, the characteristic curves CDBCmin, CDBCmid and CDBCmax are curves in which the objective characteristic curve OMDBC is shifted in the decreasing direction by the reflection brilliances R.

Further, FIGS. 20A to 20C show the characteristic curves DBC of the panel display brilliance DB in the ordinary display shown in FIGS. 16A to 16C, together. The difference between each of the correction characteristic curves CDBCmin, CDBCmid and CDBCmax and the characteristic curve DBC in the ordinary display is the correction amount of the panel display brilliance DB in the correction display for the ordinary display.

Here is a calculation formula when the correction panel display brilliance CDB, which is the panel display brilliance DB in the correction display, is calculated as the correction amount $\Delta DB$ (the correction amount $\Delta DB$ of the panel display brilliance DB) for the panel display brilliance DB in the ordinary display shown in FIG. 16C. The characteristic curve DBC in the ordinary display shown in FIG. 16C is referred to as the normal characteristic curve. The normal characteristic curve DBC is expressed by the function DBC(X) with respect to the signal value X, which is similarly used in the above formula (8), and a panel display brilliance DB controlled in accordance with the normal characteristic curve DBC(X) is particularly referred to as a normal panel display brilliance NDB. Then, using the above formula (10), the correction amount $\Delta DB$ is determined by the following formula (12).

Correction Amount $\Delta DB$ of Panel Display Brilliance
  $DB$=Correction Panel Display Brilliance $CDB$−
  Normal Panel Display Brilliance
  $NDB$=Objective Mixed Display Brilliance
  $OMDB$−Reflection Brilliance $R$−Normal Panel
  Display Brilliance $NDB=OMDBC(X)-R-DBC$
  $(X)$  (12)

Therefore, in the correction display, after the objective characteristic curve OMDBC(X) is set, it is only necessary to calculate the correction amounts $\Delta DB$ of the panel display brilliances DB for the respective pixels of the LCD panel 22, by the above formula (12), based on the signal values X and reflection brilliances R for the respective pixels, and to control the display brilliances of the respective pixels of the LCD panel 22, at panel display brilliances in which the corrections (additions) by the correction amounts $\Delta DB$ have been performed to the normal panel display brilliance NDB.

However, the panel display brilliances DB to be determined by the corrections of the normal panel display brilliance NDB by the correction amounts ΔDB in this way are the values of the correction panel display brilliances CDB themselves. Therefore, without determining the correction amounts ΔDB, the correction panel display brilliances CDB may be directly determined using the above formula (10) or the above formula (11), and the display brilliances of the respective pixels of the LCD panel 22 may be controlled such that they become the correction panel display brilliances CDB. Also in that case, it can be interpreted that the normal panel display brilliance NDB in the ordinary display has been corrected.

Here, it is impossible to perform such a correction that the correction panel display brilliance CDB becomes a negative value, and from the above formula (9), it is not preferable that the objective mixed display brilliance OMDB has a value less than the reflection brilliance R.

Therefore, it is preferable that the minimum value (the lower limit value of the variable range) of the objective mixed display brilliance OMDB (the objective characteristic curve OMDBC(X)) be the maximum value Rmax of the reflection brilliance R as shown in FIGS. 19A to 19C, or be a value greater than this. In the case where the minimum value (the lower limit value of the variable range of the normal characteristic curve DBC) of the panel display brilliance DB (the normal panel display brilliance NDB) in the ordinary display does not become 0, it is preferable to be a value that is equal to or greater than a value resulting from adding the minimum value and the maximum value Rmax of the reflection brilliance R.

However, for example, in the case where there is no problem even if the gradation characteristic of the low brilliance side of the display image is bad, the minimum value of the objective mixed display brilliance OMDB may be reduced to be less than the maximum value Rmax of the reflection brilliance R, or the like.

Thus, it is preferable that the minimum value of the objective mixed display brilliance OMDB (the objective characteristic curve OMDBC(X)) be altered depending on the situation of the reflection brilliance distribution on the display surface 34 or the like. It is possible that a user is allowed to perform the setting manually.

On the other hand, it is preferable that the maximum value (the upper limit value of the variable range) of the objective mixed display brilliance OMDB (the objective characteristic curve OMDBC(X)) be matched with the maximum value DBmax of the normal panel display brilliance NDB in the ordinary display, for keeping the brightness of the screen at a brightness equivalent to the ordinary display. Therefore, the examples of the characteristic curves in FIGS. 19A to 19C adopt such a value. However, as described later, it is preferable that the maximum value of the objective mixed display brilliance OMDB be altered depending on the situation of the reflection brilliance distribution on the display surface 34 or the like.

Here, as the objective characteristic curve OMDBC(X), an arbitrary form of characteristic curve can be set, if it is an identical characteristic curve regardless of the reflection brilliance R.

Next, in the correction display, specific schemes for controlling the panel display brilliance DB in accordance with the correction characteristic curves CDBC(X) (the correction characteristic curves CDBCmin, CDBCmid, and CDBCmax) shown in FIGS. 20A to 20C such that the mixed display brilliance MDB is controlled in accordance with the objective characteristic curve OMDBC shown in FIGS. 19A to 19C are explained.

In the case where, unlike the embodiment, the display 20 is a self-light-emission type display panel (two-dimensional display element) such as an organic EL display, the back light is unnecessary, and it is possible to control the display light brilliances of the respective pixels of the display panel, by changing the voltage of the a drive circuit that drives pixel electrodes. Therefore, in the case of the self-light-emission type panel, it is only necessary to control the display brilliances of the respective pixels in accordance with the correction characteristic curves CDBC(X) shown in FIGS. 20A to 20C, based on the reflection brilliances R for the respective pixels and the signal values X of the input picture signals.

On the other hand, in the case of a transmission type display panel such as the LCD panel in the embodiment, the display brilliance control in the correction display is performed as follows.

As described above, the panel display brilliance DB is expressed by the following formula (13), with the back light brilliance BL and the light transmittance T of the LCD panel 22.

$$\text{Panel Display Brilliance } DB = \text{Back Light Brilliance } BL \times \text{Light Transmittance } T \quad (13)$$

Therefore, as the scheme for controlling (correcting) the panel display brilliance DB such that it becomes the correction panel display brilliance CDB, three schemes in each of which any one or both of the back light brilliance BL and the light transmittance T of the LCD panel 22 in the ordinary display are corrected are possible.

Hence, a display brilliance control (display brilliance correction process) in which only the back light brilliance BL is corrected is referred to as a first correction scheme, a display brilliance control (display brilliance correction process) in which only the light transmittance T of the LCD panel 22 is corrected is referred to as a second correction scheme, and a display brilliance control (display brilliance correction process) in which both of the back light brilliance BL and the light transmittance T of the LCD panel 22 are corrected is referred to as a third scheme. In the following, they are explained in order.

First, the display brilliance correction process in the first correction scheme is explained. The first correction scheme is a scheme in which only the back light brilliance BL is corrected such that the panel display brilliance DB becomes the correction panel display brilliance CDB in accordance with the correction characteristic curves CDBC(X) (the correction characteristic curves ODBCmin, ODBCmid and ODBCmax) shown in FIGS. 20A to 20C. Such a back light brilliance BL is referred to as a correction back light brilliance CBL. Then, the correction back light brilliance CBL is determined from the above formulas (10) and (13), by the following formula (14).

$$\text{Correction Back Light Brilliance } CBL = \text{Correction Panel Display Brilliance } CDB/\text{Light Transmittance } T = (\text{Objective Mixed Display Brilliance } OMDB - \text{Reflection Brilliance } R)/\text{Light Transmittance } T \quad (14)$$

Here, a characteristic curve with which, with respect to the signal value X of the input picture signal, the correction back light brilliance CBL is in accordance is referred to as a back light correction characteristic curve, and the back light correction characteristic curve is expressed by a function CBLC(X) with respect to the signal value X of the input picture signal. A characteristic curve TC of the light transmittance T in the ordinary display shown in FIG. 16A is referred to as a normal light transmittance characteristic curve, and the normal light transmittance characteristic curve is expressed by a function TC(X) with respect to the signal value X. Further, an objective characteristic curve OMDBC with which the objective mixed display brilliance OMDB is in accordance is expressed by the function OMDBC(X), which is similarly used in the above formulas (9) and (10), and the correction characteristic curve CDBC with which the correction panel display brilliance CDB is in accordance is expressed by the function CDBC(X). In this case, the above formula (14) is expressed by the following formula (15).

$$CBLC(X)=CDBC(X)/TC(X)=(OMDBC(X)-R)/TC(X) \quad (15)$$

Therefore, after the objective characteristic curve OMDBC(X) is set, it is only necessary to calculate the correction back light brilliances CBL of the respective pixels of the LCD panel 22, by the above formula (15), based on the signal values X and reflection brilliances R for the respective pixels, and to control the back light brilliances BL for the respective pixels such that they become the correction back light brilliances CBL. For example, the CPU 80 outputs the control signal to the back light control signal generation unit 50, based on the reflection brilliance distribution acquired from the camera image analysis unit 72 and the signal values X for the respective pixels of the display image, which can be acquired from the picture signal generation unit 40 or the like, and thereby, such a control can be performed.

The case where the objective characteristic curve OMDBC(X) with which the objective mixed display brilliance OMDB is in accordance is set as shown in FIGS. 19A to 19C is explained. The characteristic curve DBC of the panel display brilliance DB in the ordinary display shown in FIG. 16C is referred to as the normal characteristic curve DBC, which is similarly used in the above formula (12), and the normal characteristic curve DBC is expressed by the function DBC(X) with respect to the signal value X. Then, the objective characteristic curve OMDBC(X) is expressed by the following formula (16) (see FIGS. 19A to 19C).

$$OMDBC(X)=DBC(X) \cdot (MDB\text{max}-R\text{max})/MDB\text{max}+R\text{max} \quad (16)$$

As described above, MDBmax is equal to the maximum value (the maximum value of the normal characteristic curve DBC(X)) DBmax of the panel display brilliance DB in the ordinary display, and when the maximum value Tmax of the light transmittance T in the ordinary display is 100 percent (the numerical value is 1.0), DBmax is equal to the back light brilliance BL0 in the ordinary display shown in FIG. 16B (this is assumed, herein). Rmax represents the maximum value of the reflection brilliance R.

Further, from the above formula (13), the normal characteristic curve DBC(X) is a curve that results from multiplying the normal light transmittance characteristic curve TC(X) by the back light brilliance BL0 in the ordinary display. Therefore, the above formula (16) is expressed by the following formula (17).

$$OMDBC(X)=BL0 \cdot TC(X) \cdot (BL0-R\text{max})/BL0+R\text{max}=TC(X) \cdot (BL0-R\text{max})+R\text{max} \quad (17)$$

By substituting the above formula (17) into the above formula (15), the following formula (18) is obtained.

$$CBLC(X)=BL0-R\text{max}+(R\text{max}-R)/TC(X) \quad (18)$$

Figure 21A:
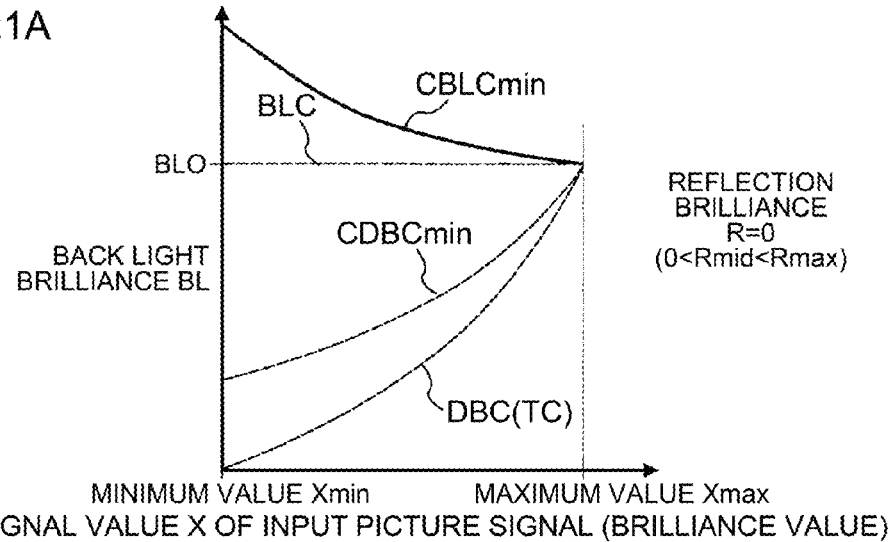
FIG. 21A is a diagram showing a relation between the signal value of the input picture signal and the back light brilliance in a correction display by a first correction scheme.
Figure 21B:
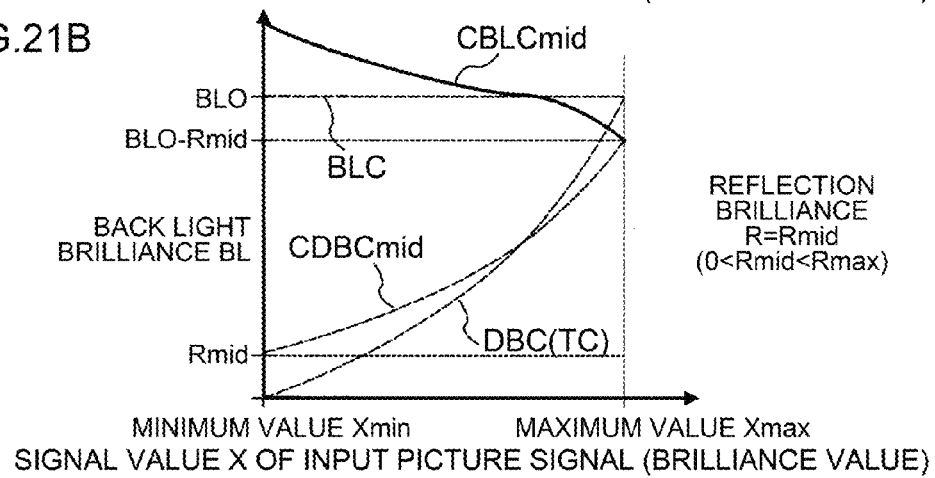
FIG. 21B is another diagram showing a relation between the signal value of the input picture signal and the back light brilliance in the correction display by the first correction scheme.
Figure 21C:
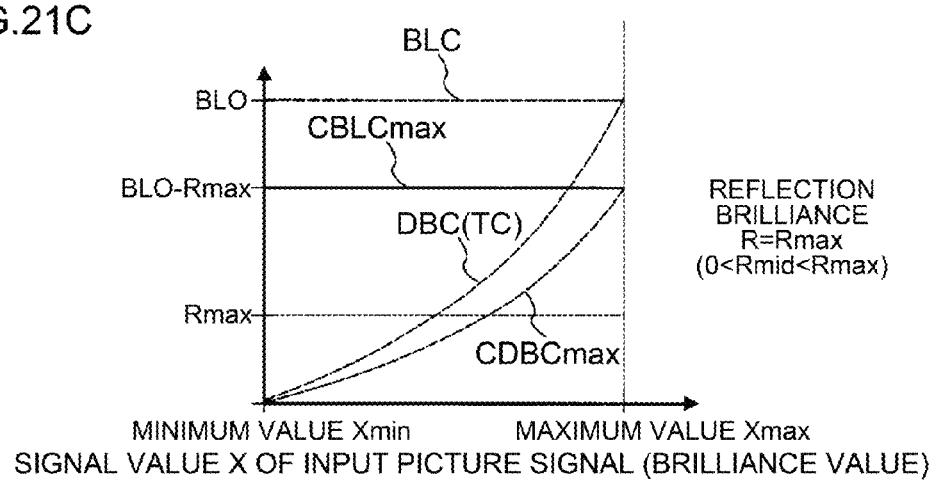
FIG. 21C is another diagram showing a relation between the signal value of the input picture signal and the back light brilliance in the correction display by the first correction scheme.

FIGS. 21A to 21C are diagrams showing relations between the signal value X of the input picture signal and the back light brilliance BL (the correction back light brilliance CBL) when the correction display is performed by the first correction scheme in accordance with the above formula (18). Corresponding to FIGS. 20A to 20C, FIG. 21A is a diagram showing the relation at the point (pixel) where the reflection brilliance R is 0, FIG. 21B is a diagram showing the relation at the point (pixel) where the reflection brilliance R is the middle value Rmid of 0 to the maximum value, and FIG. 21C is a diagram showing the relation at the point (pixel) where the reflection brilliance R is the maximum value Rmax of the whole of the display surface 34.

Further, FIGS. 21A to 21C show the characteristic curve BLC relevant to the back light brilliance BL in the ordinary display (the straight line indicating the fixed back light brilliance BL0), the normal characteristic curve DBC (corresponding to the normal light transmittance characteristic curve TC) relevant to the panel display brilliance DB in the ordinary display shown in FIGS. 20A to 20C, and the correction characteristic curves CDBC(X) (CDBCmin, CDBCmid and CDBCmax) relevant to the panel display brilliance DB in the correction display, also, in a manner in which the brilliance levels are matched.

In FIGS. 21A to 21C, the above back light correction characteristic curve CBLC(X) is shown as the back light correction characteristic curves CBLCmin, CBLCmid and CBLCmax that are different in the reflection brilliance R. In the correction display by the first correction scheme, the back light brilliance BL is controlled with respect to the signal value X of the input picture signal, in accordance with the back light correction curves CBLCmin, CBLCmid and CBLCmax.

The respective back light correction characteristic curves CBLCmin, CBLCmid and CBLCmax show back light brilliances BL for matching the normal characteristic curve DBC of the panel display brilliance DB in the ordinary display, with the correction characteristic curves CDBCmin, CDBCmid and CDBCmax of the panel display brilliance DB in the correction display.

As is obvious from FIG. 21C and the above formula (18), it is shown that, at the point where the reflection brilliance R is the maximum value Rmax, the back light correction characteristic curve CBLCmax is shifted in a direction in which it becomes lower than the characteristic curve BLC in the ordinary display by the brilliance Rmax, and regardless of the signal value X, the back light brilliance BL is kept at a back light brilliance (BL0−Rmax).

This means that, at the point where the reflection brilliance R is the maximum value Rmax, the objective characteristic curve OMDBC set as shown in FIGS. 20A to 20C, regardless of the signal value X, decreases the back light brilliance BL to the back light brilliance (BL0−Rmax), and in the case of assuming that the light transmittance T is controlled with respect to the signal value X in accordance with the normal light transmittance characteristic curve TC(X) in the ordinary display, the characteristic curve with which the mixed display brilliance MDB is in accordance is set as the objective characteristic curve.

At the points where the reflection brilliance R is not the maximum value Rmax, as shown by the back light correction characteristic curves CBLCmin and CBLCmid in FIGS. 21A and 21B, when the signal value X is the maximum value Xmax, the back light brilliances BL are set to back light brilliances BL each of which is lower than the back light brilliance BL0 in the ordinary display by the same brilliance as the reflection brilliance R. Then, there is a tendency that the lower the signal value X is, the higher the back light brilliance BL is.

In the above formula (18), in the case where the light transmittance T (the normal light transmittance characteristic curve TC(X)) becomes 0 when the signal value X is the minimum value Xmin, the back light brilliance BT diverges. However, actually, the light transmittance T does not become 0. Further, in a region where the signal value X is low, the pixels are dark, and a difference in the panel display brilliance DB from the correction characteristic curve CDBCmin or CDBCmid does not lead to a large difference on the display image. Therefore, for example, by providing an upper lime for the back light brilliance BT, it is possible to avoid the divergence of the back light brilliance BT.

Next, the display brilliance correction process in the second correction scheme is explained. The second correction scheme is a scheme in which only the light transmittance T is corrected such that the panel display brilliance DB becomes the correction panel display brilliance CDB in accordance with the correction characteristic curves CDBC (X) (the correction characteristic curves ODBCmin, ODBCmid and ODBCmax) shown in FIGS. 20A to 20C. Such a light transmittance T is referred to as a correction light transmittance CT. Then, the correction light transmittance CT is determined from the above formulas (10) and (13), by the following formula (19).

Correction Light Transmittance $CT$=Correction Panel Display Brilliance $CDB$/Back Light Brilliance $BL$=(Objective Mixed Display Brilliance $OMDB$−Reflection Brilliance $R$)/Back Light Brilliance $BL$ (19)

Here, a characteristic curve with which, with respect to the signal value X of the input picture signal, the correction light transmittance CT is in accordance is referred to as a light transmittance correction characteristic curve, and the light transmittance correction characteristic curve is expressed by a function CTC(X) with respect to the signal value X of the input picture signal. A characteristic curve BLC of the back light brilliance BL in the ordinary display shown in FIG. 16B is referred to as a normal back light characteristic curve, and the normal back light characteristic curve is expressed by a function BLC(X) with respect to the signal value X. Further, the objective characteristic curve with which the objective mixed display brilliance OMDB is in accordance is expressed by the function OMDBC(X), which is similarly used in the above formulas (9) and (10), and the correction characteristic curve with which the correction panel display brilliance CDB is in accordance is expressed by the function CDBC(X). In this case, the above formula (19) is expressed by the following formula (20).

$CTC(X)=CDBC(X)/BLC(X)=(OMDBC(X)−R)/BLC(X)$ (20)

Therefore, after the objective characteristic curve OMDBC(X) is set, it is only necessary to calculate the correction light transmittances CT for the respective pixels of the LCD panel 22, by the above formula (20), based on the signal values X and reflection brilliances R for the respective pixels, and to control the light transmittances T for the respective pixels such that they becomes the correction light transmittances CT.

The case where the objective characteristic curve OMDBC(X) with which the objective mixed display brilliance OMDB is in accordance is set as shown in FIGS. 19A to 19C is explained. The characteristic curve DBC of the panel display brilliance DB in the ordinary display shown in FIG. 16C is referred to as the normal characteristic curve, which is similarly used in the above formula (12), and the normal characteristic curve DBC is expressed by the function DBC(X) with respect to the signal value X. Further, the characteristic curve TC of the light transmittance T in the ordinary display shown in FIG. 16A is referred to as the normal light transmittance characteristic curve. The normal light transmittance characteristic curve, which is expressed by the function TC(X) with respect to the signal value X, expresses the objective characteristic curve OMDBC(X) similarly to the above formula (17). Then, by substituting it into the above formula (20), the following formula (21) is obtained. Here, similarly to the above formula (17), BLC(X) in the above formula (20) is BLC(X) BL0.

$CTC(X)=(TC(X)\cdot(BL0−Rmax)+Rmax−R)/BL0=TC(X)\cdot(BL0−Rmax)/BL0+(Rmax−R)/BL0$ (21)

Figure 22A:
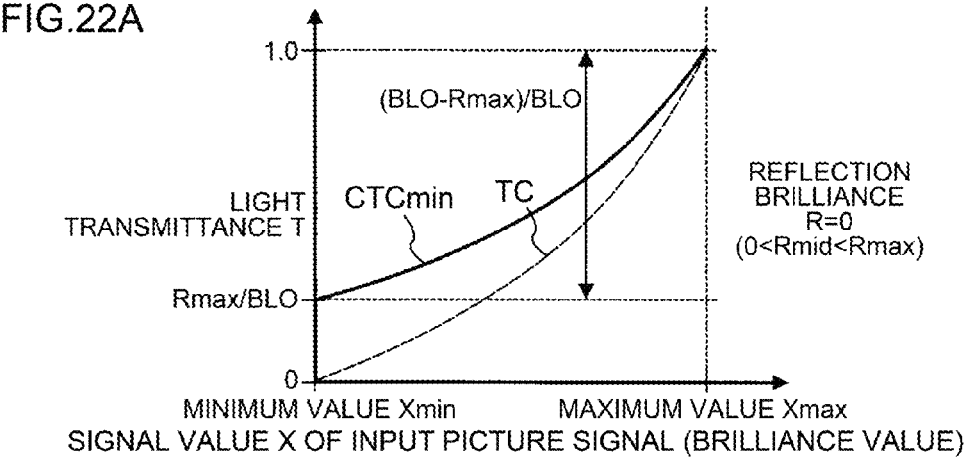
FIG. 22A is a diagram showing a relation between the signal value of the input picture signal and the light transmittance in a correction display by a second correction scheme.
Figure 22B:
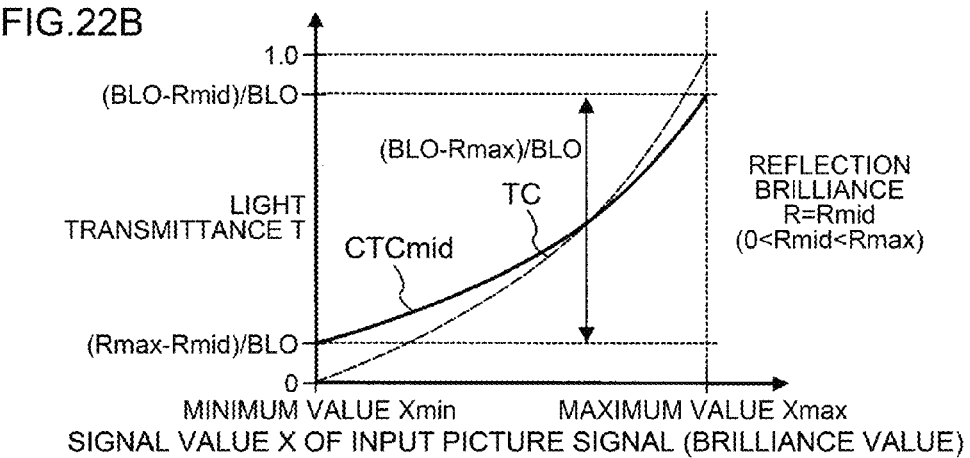
FIG. 22B is another diagram showing a relation between the signal value of the input picture signal and the light transmittance in the correction display by the second correction scheme.
Figure 22C:
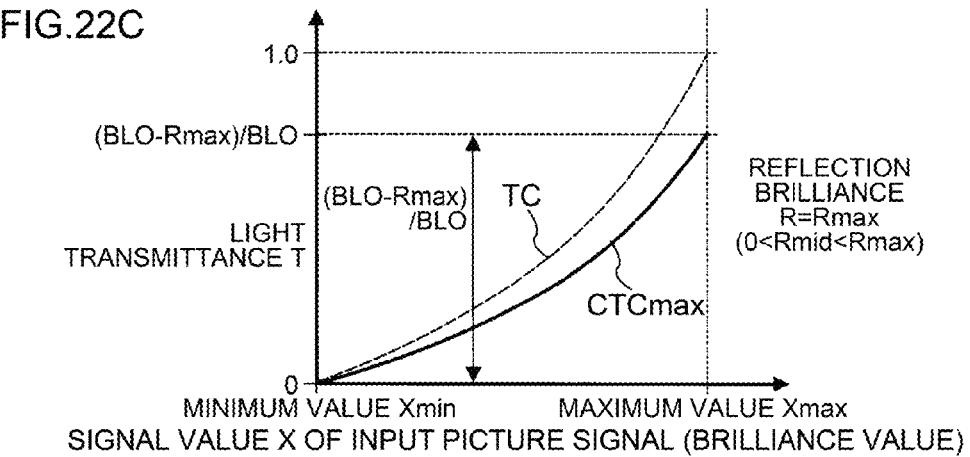
FIG. 22C is another diagram showing a relation between the signal value of the input picture signal and the light transmittance in the correction display by the second correction scheme.

FIGS. 22A to 22C are diagrams showing relations between the signal value X of the input picture signal and the light transmittance T (the correction light transmittance CT) when the correction display is performed by the second correction scheme in accordance with the above formula (21). Corresponding to FIGS. 20A to 20C, FIG. 22A is a diagram showing the relation at the point (pixel) where the reflection brilliance R is 0, FIG. 22B is a diagram showing the relation at the point (pixel) where the reflection brilliance R is the middle value Rmid of 0 to the maximum value, and FIG. 22C is a diagram showing the relation at the point (pixel) where the reflection brilliance R is the maximum value Rmax of the whole of the display surface 34. Here, FIGS. 22A to 22C show, also, the light transmittance correction characteristic curve TC for controlling the light transmittance T in the ordinary display.

In FIGS. 22A to 22C, the above light transmittance correction characteristic curve CTC(X) is shown as light transmittance correction characteristic curves CTCmin, CTCmid and CTCmax that are different in the reflection brilliance R. In the correction display by the second correction scheme, the light transmittance T is controlled with respect to the signal value X of the input picture signal, in accordance with those light transmittance correction characteristic curves CTCmin, CTCmid and CTCmax. The respective light transmittance correction characteristic curves CTCmin, CTCmid and CTCmax show light transmittances T for matching the normal characteristic curve DBC of the panel display brilliance DB in the ordinary display, with the correction characteristic curves CDBCmin, CDBCmid and CDBCmax of the panel display brilliance DB in the correction display.

As is obvious from FIGS. 22A to 22C and the above formula (21), regardless of the reflection brilliance R, the light transmittance correction characteristic curves CTC(X) are curves in each of which the normal light transmittance characteristic curve TC(X) is expanded or shrunk (compressed) by (BL0−Rmax)/BL0 fold with respect to the light transmittance T, and in each of which the light transmittance T is shifted by a value (Rmax−R)/BL0 depending on the reflection brilliance R, such that it becomes lower than 1.0 as a whole. Further, as is obvious from the above formula (20), they are equivalent to curves that result from dividing the correction characteristic curves CDBC(X) (CDBCmin, CDBCmid and CDBCmax) shown in FIGS. 20A to 20C by the back light brilliance BL0.

Here, in the second correction scheme, it is unnecessary to control the back light brilliance BL for each pixel, and therefore, it is unnecessary that, as shown in the embodiment, the back light unit can individually control the back light brilliance for each pixel (for each region).

Further, in the case where, as the second correction scheme, the correction is performed mainly by the light transmittance T, the variable range (dynamic range) of the light transmittance T may be restricted (for example, in a panel with 8 bits: 255 gradations, only 6 bits: 64 gradations are used), and a correctable range may be reserved.

Next, the display brilliance correction process in the third scheme is explained. The third correction scheme is a scheme in which both of the back light brilliance BL and the light transmittance T are corrected such that the panel display brilliance DB becomes the correction panel display brilliance CDB in accordance with the correction characteristic curve CDBC. The back light brilliance BL to be corrected is referred to as the correction back light brilliance CBL, and the light transmittance T to be corrected is referred to as the correction light transmittance CT. Then, the following formula (22) is derived from the above formulas (10) and (13).

Correction Back Light Brilliance $CBL$×Correction Light Transmittance $CT$=Correction Panel Display Brilliance $CDB$=Objective Mixed Display Brilliance $OMDB$−Reflection Brilliance $R$ (22)

In this case, the correction back light brilliance CBL and the correction light transmittance CT are not unambiguously determined, and they can be freely altered, at least if the panel display brilliance DB resulting from multiplying them satisfies the above formula (22). That is, it is only necessary to control each of the correction back light brilliance CBL and the correction light transmittance CT such that the correction back light brilliance CBL×the correction light transmittance CT is controlled in accordance with the correction characteristic curves CDBC(X) (CDBCmin, CDBCmid and CDBCmax) shown in FIGS. 20A to 20C.

For example, a mode in which the correction amount of the back light brilliance BL in the first correction scheme and the correction amount of the light transmittance in the second correction scheme are adjusted for the back light brilliance BL and light transmittance T in the ordinary display respectively, and thereby the first correction scheme and the second correction scheme are concurrently used, a mode in which as the correction scheme to be applied for each pixel, an alternative correction scheme of the first correction scheme and second correction scheme is adopted depending on the reflection brilliance R for each pixel, and a mode in which as the correction scheme to be applied, an alternative scheme of the first correction scheme and second correction scheme is adopted depending on the signal value X are possible. Furthermore, a combination of these modes is also possible, and any mode may be adopted.

Here, as the third correction scheme, a mode in which the first correction scheme is applied to a pixel for which the reflection brilliance R is the maximum value Rmax and the second correction scheme is applied to a pixel for which the reflection brilliance R is the minimum value 0 is explained.

Figure 23A:
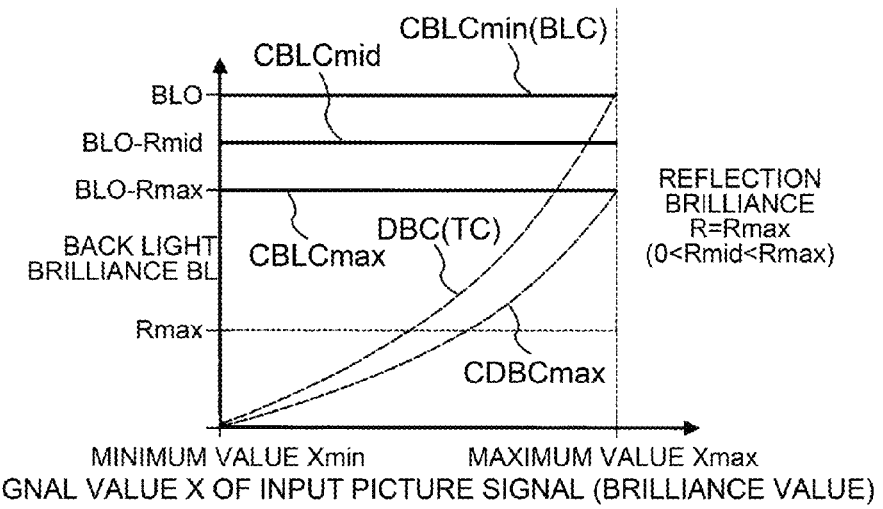
FIG. 23A is a diagram showing a relation between the signal value of the input picture signal and the back light brilliance in a correction display by a third correction scheme.
Figure 23B:
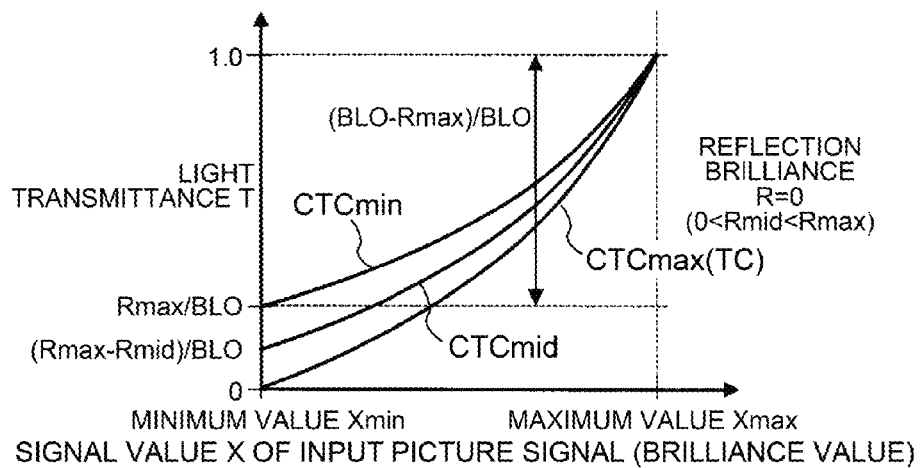
FIG. 23B is another diagram showing a relation between the signal value of the input picture signal and the light transmittance in the correction display by the third correction scheme.

FIGS. 23A and 23B are diagrams showing the display brilliance control (display brilliance correction process) in the third correction scheme. FIG. 23A is a diagram showing a relation between the signal value X of the input picture signal and the back light brilliance BL (the correction back light brilliance CBL), and FIG. 23B is a diagram showing a relation between the signal value X of the input picture signal and the light transmittance T (the correction light transmittance CT).

Similarly to the above first correction scheme and second correction scheme, FIGS. 23A and 23B show characteristic curves when the mixed display brilliance MDB is controlled for the display brilliance control in the ordinary display shown in FIGS. 16A to 16C, in accordance with the objective characteristic curve OMDBC, which is an identical characteristic curve regardless of the reflection brilliance R as shown in FIGS. 20A to 20C.

Corresponding to FIGS. 20A to 20C, FIG. 23A shows the back light correction characteristic curve CBLCmin relevant to the point (pixel) where the reflection brilliance R is 0, the back light correction characteristic curve CBLCmid relevant to the point (pixel) where the reflection brilliance R is the middle value Rmid of 0 to the maximum value, and the back light correction characteristic curve CBLCmax relevant to the point (pixel) where the reflection brilliance R is the maximum value Rmax of the whole of the display surface 34.

Similarly, FIG. 23B shows the light transmittance correction characteristic curve CTCmin relevant to the point (pixel) where the reflection brilliance R is 0, the light transmittance correction characteristic curve CTCmid relevant to the point (pixel) where the reflection brilliance R is the middle value Rmid of 0 to the maximum value, and the light transmittance correction characteristic curve CTCmax relevant to the point (pixel) where the reflection brilliance R is the maximum value Rmax of the whole of the display surface 34.

According to these, at the point where the reflection brilliance R is 0, as shown in FIG. 23A, the back light brilliance BL is controlled with respect to the signal X, in accordance with the back light correction characteristic curve CBLCmin, and similarly to the case of the normal display, the back light brilliance BL is kept at the fixed brilliance BL0, regardless of the signal value X.

Therefore, at the point where the reflection brilliance R is 0, the same display brilliance control as the second correction scheme is performed, and as shown in FIG. 23B, the light transmittance T is controlled in accordance with the light transmittance correction characteristic curve CTCmin that coincides with that in the second correction scheme shown in FIG. 22A. Thereby, the panel display brilliance DB is controlled in accordance with the correction characteristic curve CDBCmin shown in FIG. 20A, and the mixed display brilliance MDB is controlled in accordance with the objective characteristic curve OMDBC shown in FIG. 19A.

Further, at the point where the reflection brilliance R is the maximum value Rmax, as shown in FIG. 23A, the back light brilliance BL is controlled with respect to the signal value X, in accordance with the back light correction characteristic curve CBLCmax, and the back light brilliance BL is decreased to a fixed back light brilliance (BL0−Rmax) to be kept, regardless of the signal value X.

Therefore, at the point where the reflection brilliance R is the maximum value Rmax, the same display brilliance control as the first correction scheme is performed, and as shown in FIG. 23B, the light transmittance T is controlled in accordance with the light transmittance correction characteristic curve CTCmax that coincides with the characteristic curve TC in the ordinary display shown in FIG. 16C. Thereby, the panel display brilliance DB is controlled in accordance with the correction characteristic curve CDBCmax shown in FIG. 20C, and the mixed display brilliance MDB is controlled in accordance with the objective characteristic curve OMDBC shown in FIG. 19C.

On the other hand, at the point where the reflection brilliance R is the middle value Rmid, as shown in FIG. 23A, the back light brilliance BL is controlled with respect to the signal value X, in accordance with the back light correction characteristic curve CBLCmid, and the back light brilliance BL is kept at a fixed back light brilliance (BL0−Rmid), regardless of the signal value X. In contrast, the light transmittance T is controlled in accordance with the light transmittance correction characteristic curve CTCmid shown in FIG. 23B.

The light transmittance correction characteristic curve CTCmid has the maximum value 1.0 of the light transmittance T, with respect to the maximum value Xmax of the signal value X, similarly to the other light transmittance correction characteristic curves CTCmin and CTCmax, and has a value of (Rmax−Rmid)/BL0, with respect to the minimum value Xmin of the signal value X. Thereby, the panel display brilliance DB is controlled in accordance with the correction characteristic curve CDBCmid shown in FIG. 20B, and the mixed display brilliance MDB is controlled in accordance with the objective characteristic curve OMDBC shown in FIG. 19B.

In the control at the point where the reflection brilliance R is the middle value Rmid in the way, which is different from both of the first correction scheme and the second correction scheme, the back light brilliance BL is decreased by an amount equivalent to the reflection brilliance R, and the curve shape of the light transmittance correction characteristic curve CTCmid is matched with the correction characteristic curve CDBCmid.

According to the third correction scheme, since the back light brilliance BL is decreased, there is a power saving effect, and since the back light brilliance only needs to be kept at the fixed brilliance regardless of the signal value X, the control is simple. The correction display by the third correction scheme can be referred to as a "power saving mode".

Next, in the above correction display, a process for further enhancing the visibility is explained.

In the example of the objective characteristic curve OMDBC (objective mixed display brilliance OMDB) shown in FIGS. 19A to 19C, the case where the maximum value MDBmax when the signal value X is the signal value Xmax is matched with the maximum value DBmax of the panel display brilliance DB in the ordinary display has been shown. However, the maximum value MDBmax may be lower or higher than the maximum value DBmax of the panel display brilliance DB in the ordinary display.

Figure 24A:
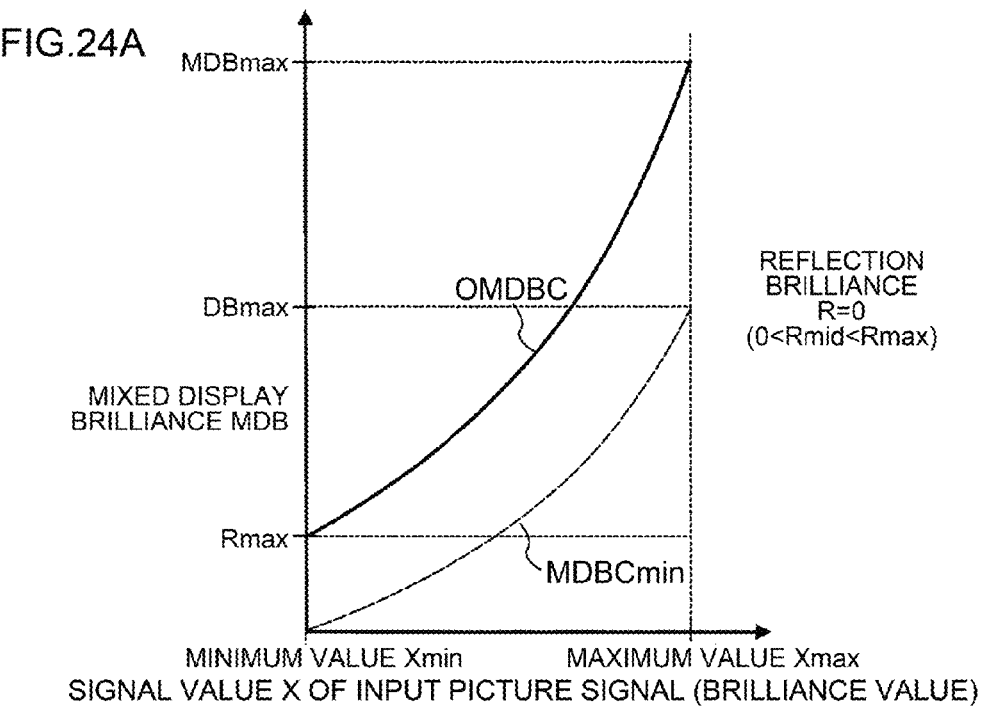
FIG. 24A is a diagram that is used for the explanation of the correction display for enhancing the visibility and that shows a relation between the signal value of the input picture signal and the mixed display brilliance.
Figure 24B:
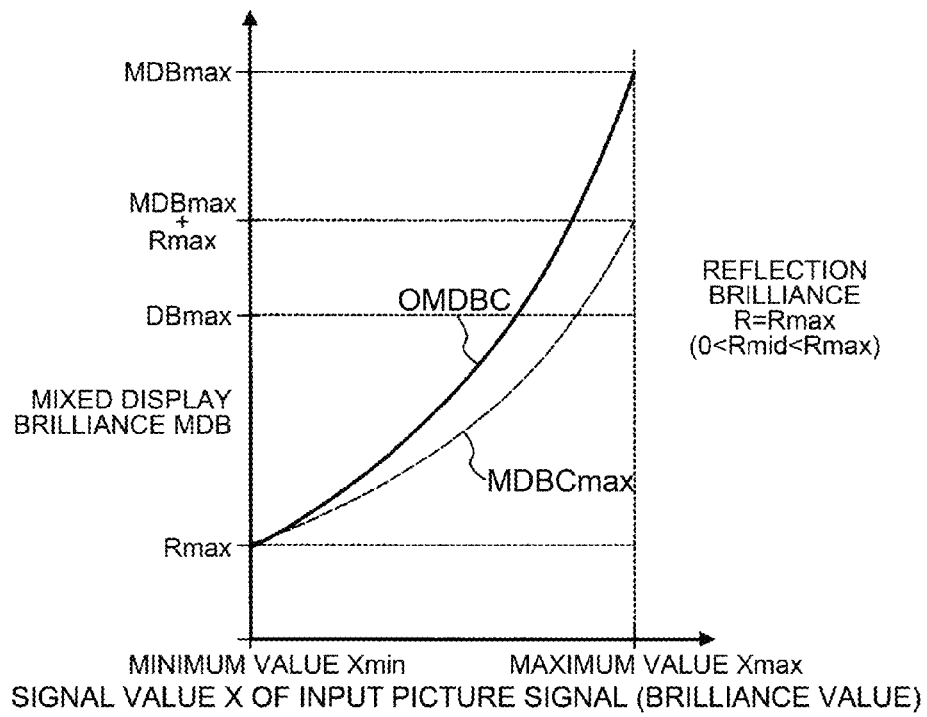
FIG. 24B is another diagram that is used for the explanation of the correction display for enhancing the visibility and that shows a relation between the signal value of the input picture signal and the mixed display brilliance.

FIGS. 24A and 24B show the case where the maximum value MDBmax of the objective characteristic curve OMDBC (objective mixed display brilliance OMDB) shown in FIGS. 19A to 19C is higher than the maximum value DBmax of the panel display brilliance DB in the ordinary display. FIG. 24A shows a relation at the point (pixel) where the reflection brilliance R is 0, and FIG. 24B shows a relation at the point (pixel) where the reflection brilliance R is the maximum value Rmax of the whole of the display surface 34. The relation at the point (pixel) where the reflection brilliance R is the middle value Rmid of 0 to the maximum value is omitted.

The case where the objective characteristic curve OMDBC is set as shown in FIGS. 24A and 24B means that the back light brilliance BL in the correction display is increased relative to the case where the objective characteristic curve OMDBC is set as shown in FIGS. 19A to 19C. Assuming that the back light brilliance BL0 in the ordinary display is increased, the objective characteristic curve OMDBC is set similarly to FIGS. 19A to 19C. The control coincides with the display brilliance control in the correction display that uses an arbitrary correction scheme described above. Therefore, for the control in this case, the detailed explanation is unnecessary. The same goes for the case where the maximum value MDBmax of the objective characteristic curve OMDBC is lower than the maximum value DBmax of the panel display brilliance DB in the ordinary display.

Here, in the case of performing the display brilliance control to which the second correction scheme (a scheme in which only the light transmittance T is corrected) is applied assuming that the back light brilliance BL0 in the ordinary display is altered in this way, it can be said that the display brilliance control in this case corresponds to not the second correction scheme but the third correction scheme, because the back light brilliance BL also is substantially altered relative to the ordinary display. However, since the back light brilliance BL is not altered depending on the reflection brilliance R or the signal value X of the input picture signal, it is appropriate to regard it as the display brilliance control corresponding to the second correction scheme.

In the case where the maximum value MDBmax of the objective characteristic curve OMDBC is lower than the maximum value DBmax of the panel display brilliance DB in the ordinary display (as the maximum value MDBmax of the objective characteristic curve OMDBC becomes lower), the power saving effect is increased.

Figure 25A:
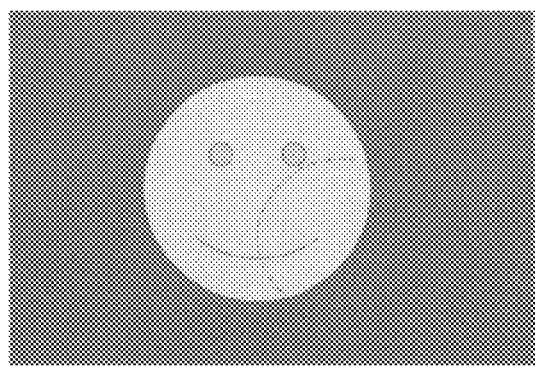
FIG. 25A is a diagram for exemplifying a display image in the correction display in a power saving mode and a visibility enhancement mode.
Figure 25B:
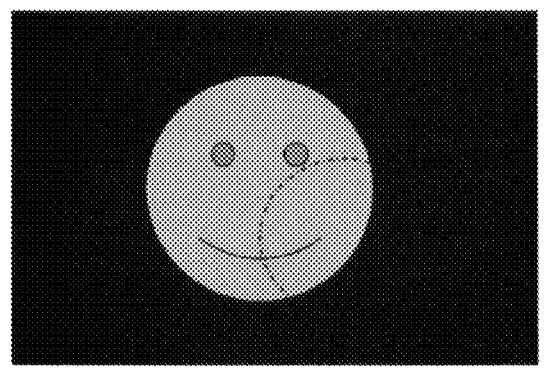
FIG. 25B is another diagram for exemplifying a display image in the correction display in the power saving mode and the visibility enhancement mode.

On the other hand, in the case where the maximum value MDBmax of the objective characteristic curve OMDBC is greater than the maximum value DBmax of the panel display brilliance DB in the ordinary display as shown in FIGS. 24A and 24B, a display image as shown in FIG. 25B is observed, and compared to FIG. 25A to be observed in the case where the maximum value MDBmax of the objective characteristic curve OMDBC is matched with the maximum value DBmax of the panel display brilliance DB in the ordinary display as shown in FIGS. 19A to 19C, it is possible to improve the contrast ratio and to enhance the visibility.

Here, in the case of the correction display by any of the first correction scheme to the third correction scheme, or in the case of the correction display for a self-light-emission type display panel, it is preferable that a user can appropriately select between a "power saving mode" for achieving power saving and a "visibility enhancement mode" for prioritizing the enhancement of visibility, depending on the situation, by predetermined selection means (the input operation using the touch panel 36, or the like).

When the "power saving mode" is selected, as shown in FIGS. 19A to 19C, it is preferable to set the maximum value MDBmax of the objective characteristic curve OMDBC, to a value less than or equal to the maximum value DBmax of the panel display brilliance DB in the ordinary display, that is, to set the upper limit value (the maximum value MDBmax) of the variable range of the objective mixed display brilliance OMDB, to a value less than or equal to the upper limit value (the maximum value DBmax) of the variable range of the panel display brilliance DB of the display image in the ordinary display (when the correction is not performed).

On the other hand, when the "visibility enhancement mode" is selected, it is preferable to set the maximum value MDBmax of the objective characteristic curve OMDBC, to a value greater than the maximum value DBmax of the panel display brilliance DB in the ordinary display, that is, to set the upper limit value (the maximum value MDBmax) of the variable range of the objective mixed display brilliance OMDB, to a value greater than the upper limit value (the maximum value DBmax) of the variable range of the panel display brilliance DB of the display image in the ordinary display (when the correction is not performed). Particularly, it is preferable to set the upper limit value (the maximum value MDBmax) of the variable range of the objective mixed display brilliance OMDB, to a value greater than or equal to the mixed display brilliance, which results from adding the maximum brilliance in the reflection brilliance distribution (the maximum value Rmax of the reflection brilliance R) and the upper limit value (the maximum value DBmax) of the variable range of the panel display brilliance DB of the display image in the ordinary display (when the correction is not performed), because the image display can be performed in a dynamic range equal to or greater than the dynamic range of the display brilliance in the ordinary display.

The maximum value DBmax of the objective mixed display brilliance OMDB to be set in these respective modes may be a value in accordance with an algorithm determined in advance, or may be a value that can be arbitrarily set and altered by a user. Without selecting a mode, the value itself may be a value that can be arbitrarily set and altered by a user. Furthermore, the mode may be automatically switched to either one, depending on the state of the reflection brilliance distribution or the like. For example, when the reflection brilliance R is wholly low, the mode is switched to the "power saving mode", and when it is high, the mode is switched to the "visibility enhancement mode". Alternatively, the maximum value DBmax may be automatically switched, depending on the state of the reflection brilliance distribution or the like.

In the above display brilliance control (display brilliance correction process) in the correction display, for example, in FIG. 5, the CPU 80 acquires the information about the reflection brilliance distribution on the display surface 34, and sets the objective characteristic curve OMDBC (see FIGS. 19A to 19C), based on the information about the reflection brilliance distribution. Then, when the back light brilliance BL is corrected, the CPU 80 determines the back light brilliances BL for the respective pixels of the LCD panel 22, from the reflection brilliances R, the signal values X of the input picture signals and the objective characteristic curves OMDBC for the respective pixels of the LCD panel 22, and in accordance with them, outputs the control signals to the back light control signal generation unit 50 to control the back light brilliances.

When the light transmittance T of the LCD panel 22 is corrected, similarly, the light transmittances T for the respective pixels of the LCD panel 22 are calculated, and the information is output to the picture signal generation unit 40. The picture signals in accordance with it are output from the picture signal generation unit 40 to the LCD drive circuit 42, and thereby, it is possible to control the light transmittances T for the respective pixels of the LCD panel 22. However, it is possible that intermediate information is output to the picture signal generation unit 40 and the correction is performed in the picture signal generation unit 40. For example, in the correction display, the characteristic curve CTC(X) for controlling the light transmittance T may be generated as shown in FIGS. 20A to 20C, and the characteristic curve CTC(X) may be given to the picture signal generation unit 40. On this occasion, the information about the reflection brilliances R for the respective pixels is given simultaneously, and the correction in accordance with characteristic curves depending on the reflection brilliances R is performed for the respective pixels.

Further, such a display brilliance control (display brilliance correction process) may be performed by another processing unit, instead of being performed by the CPU 80.

Further, although the control in accordance with characteristic curves that are different depending on the reflection brilliances R are performed, the reflection brilliances R may be divided into some level ranges, and the control may be performed by a characteristic curve for each level range.

So far, in the above embodiment, the case where the display device according to the present invention is applied to a mobile terminal has been explained. However, without being limited to this, the present invention can be applied to a display device that is incorporated in an arbitrary apparatus. For example, the present invention can be effectively applied to a display device to be used in an apparatus that is not usually carried, such as a desktop personal computer and a television.

What is claimed is:

1. A display device comprising:
a two-dimensional display to display a display image that is observed by an observer;
a camera which takes an image of a side on which the display image of the display is displayed;
a face image detection circuit which detects a face image of the observer, from a taken image that is taken by the camera;
a range specifying circuit which specifies a visual field of a reflected object on a front surface of the display, wherein the visual field is visually recognizable by the observer, wherein the visual field is specified based on positional relation between the front surface of the display and the camera, and wherein the range specifying circuit specifies a position of the face image in the taken image;
a reflection brilliance estimation circuit which estimates a reflection brilliance distribution, based on brilliance information of the taken image in the visual field, the reflection brilliance distribution indicating a reflection brilliance of the reflected object at each point of the front surface of the display; and
a display brilliance correction circuit which corrects a display brilliance of the display image to be displayed on the display, such that an unevenness of the reflection brilliance is reduced, based on the reflection brilliance distribution estimated by the reflection brilliance estimation circuit,
wherein the camera performs the image taking at least at a proper exposure and a lower exposure than the proper exposure,
the face image detection circuit detects the face image of the observer, using a taken image taken at the proper exposure by the camera,
the reflection brilliance estimation circuit estimates the reflection brilliance distribution, using a taken image taken at the lower exposure than the proper exposure by the camera,
the display brilliance correction circuit corrects the display brilliance in accordance with a certain characteristic curve regardless of the reflection brilliance distribution, and
the dynamic range of the certain characteristic curve is compressed, relative to a characteristic curve in an ordinary display.

2. The display device according to claim 1,
wherein the display comprises a transmission type liquid crystal panel and a back light unit that is disposed at a back surface side of the liquid crystal panel,
the back light unit comprises multiple light-emitting elements that are two-dimensionally arrayed and whose brilliances can be controlled individually, and
the display brilliance correction circuit corrects the display brilliance of the display image to be displayed on the liquid crystal panel, by altering a light-emitting brilliance of each of the multiple light-emitting elements based on the reflection brilliance distribution estimated by the reflection brilliance estimation circuit.

3. The display device according to claim 1,
wherein the display comprises a transmission type liquid crystal panel, and a back light unit that is disposed at a back surface side of the liquid crystal panel, and
the display brilliance correction circuit corrects the display brilliance of the display image, by correcting a light transmittance at each point of the liquid crystal panel based on the reflection brilliance distribution estimated by the reflection brilliance estimation circuit.

4. The display device according to claim 1,
wherein the display comprises a transmission type liquid crystal panel, and a back light unit that is disposed at a back surface side of the liquid crystal panel,
the back light unit comprises multiple light-emitting elements that are two-dimensionally arrayed and whose brilliances can be controlled individually, and
the display brilliance correction circuit corrects the display brilliance of the display image, by altering a light-emitting brilliance of each of the multiple light-emitting elements based on the reflection brilliance distribution estimated by the reflection brilliance estimation circuit and therewith correcting a light transmittance at each point of the liquid crystal panel based on the reflection brilliance distribution estimated by the reflection brilliance estimation circuit.

5. The display device according to claim 1,
wherein the display brilliance correction circuit does not perform the correction, when the face image of the observer is not detected by the face image detection circuit.

6. The display device according to claim 1,
wherein the display brilliance correction circuit corrects the display brilliance of the display image to be displayed on the display, for an input image that is given by a picture signal as the display image to be displayed on the display, and sets a mixed display brilliance resulting from adding the display brilliance of the display image displayed on the display and the reflection brilliance of the front surface of the display between corresponding points, as an objective mixed display brilliance that is intended for a signal value of the picture signal.

7. The display device according to claim 2,
wherein the display brilliance correction circuit alters the light-emitting brilliance of each of the multiple light-emitting elements of the back light unit, and sets a mixed display brilliance resulting from adding the display brilliance of the display image displayed on the display and the reflection brilliance of the front surface of the display between corresponding points for an input image that is given by a picture signal as the display image to be displayed on the display, as an objective mixed display brilliance that is intended for a signal value of the picture signal.

8. The display device according to claim 3,
wherein the display brilliance correction circuit corrects the light transmittance at each point of the liquid crystal panel, for a brilliance of an input image that is given by a picture signal as the display image to be displayed on the display, and sets a mixed display brilliance resulting from adding the display brilliance of the display image displayed on the display and the reflection brilliance of the front surface of the display between corresponding points for the input image, as an objective mixed display brilliance that is intended for a signal value of the picture signal.

9. The display device according to claim 4,
wherein the display brilliance correction circuit alters the light-emitting brilliance of each of the multiple light-emitting elements of the back light unit, corrects the light transmittance at each point of the liquid crystal panel, for a brilliance of an input image that is given by a picture signal as the display image to be displayed on the display, and sets a mixed display brilliance resulting from adding the display brilliance of the display image displayed on the display and the reflection brilliance of the front surface of the display between corresponding points for the input image, as an objective mixed display brilliance that is intended for a signal value of the picture signal.

10. The display device according to claim 6,
wherein the display brilliance correction circuit sets a lower limit value of a variable range of the objective mixed display brilliance, to a value that is greater than or equal to a maximum brilliance in the reflection brilliance distribution.

11. The display device according to claim 10,
wherein the display brilliance correction circuit alters the lower limit value of the variable range of the objective mixed display brilliance, depending on a state of the reflection brilliance distribution.

12. The display device according to claim 1,
wherein a correction characteristic curve CDBC is calculated based on the following equation:

$$CDBC(X)=OMDBC(X)-R,$$

the value of X represents a signal value,
the correction characteristic curve CDBC is expressed by a function of $CDBC(X)$ with respect to the signal value X,
a characteristic curve OMDBC is expressed by a function of $OMDBC(X)$ with respect to the signal value X, and
the value of R represents the reflection brilliance.

* * * * *